US011212760B2

(12) United States Patent
Xu et al.

(10) Patent No.: US 11,212,760 B2
(45) Date of Patent: Dec. 28, 2021

(54) COMMON SYNCHRONIZATION CHANNEL DESIGN FOR NARROWBAND COMMUNICATIONS

(71) Applicant: QUALCOMM Incorporated, San Diego, CA (US)

(72) Inventors: Hao Xu, San Diego, CA (US); Alberto Rico Alvarino, San Diego, CA (US); Juan Montojo, San Diego, CA (US); Yongbin Wei, La Jolla, CA (US); Jing Lei, San Diego, CA (US); Renqiu Wang, San Diego, CA (US); Seyed Ali Akbar Fakoorian, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 15/249,948

(22) Filed: Aug. 29, 2016

(65) Prior Publication Data

US 2017/0094621 A1 Mar. 30, 2017

Related U.S. Application Data

(60) Provisional application No. 62/232,335, filed on Sep. 24, 2015.

(51) Int. Cl.
*H04W 56/00* (2009.01)
*H04L 29/06* (2006.01)
(Continued)

(52) U.S. Cl.
CPC ......... *H04W 56/001* (2013.01); *H04L 5/0048* (2013.01); *H04L 5/0053* (2013.01);
(Continued)

(58) Field of Classification Search
CPC ........... H04W 72/042; H04W 72/0453; H04W 72/1289; H04W 74/002; H04W 72/04; H04W 72/0446; H04W 72/0413
See application file for complete search history.

(56) References Cited

U.S. PATENT DOCUMENTS 9,209,955 B2  12/2015  Damnjanovic et al.
9,510,132 B2  11/2016  Xu et al.
(Continued)

FOREIGN PATENT DOCUMENTS

JP  2013157699 A  8/2013
JP  2018526838 A  9/2018
(Continued)

OTHER PUBLICATIONS

Huawei et al., "SIB Transmission for MTC UEs", 3GPP TSG RAN WG1 Meeting #80bis, R1-151876, Belgrade, Serbia, Apr. 20-24, 2015, 4 pgs., XP050934734, 3rd Generation Partnership Project.
(Continued)

*Primary Examiner* — Asad M Nawaz
*Assistant Examiner* — Najeeb Ansari
(74) *Attorney, Agent, or Firm* — Holland & Hart LLP

(57) ABSTRACT

Narrowband communications in a wireless communications system may include a common synchronization signal, such as a primary synchronization signal (PSS), secondary synchronization signal (SSS), or physical broadcast channel (PBCH). Content of the common synchronization signal may indicate a location of narrowband data transmissions in a narrowband region of a system bandwidth. The location of the narrowband region may be in-band within one or more wideband transmissions, within a guard-band bandwidth adjacent to the wideband transmissions bandwidth, or within a stand-alone bandwidth that is non-adjacent to the wideband transmissions. The common synchronization signal
(Continued)

may be located within a predefined search frequency and may include an anchor synchronization channel present in certain resources of allocated narrowband communications resources. Narrowband data region resources may be distributed in other portions of the narrowband communications resources, and may be allocated to different users to provide transmit diversity.

37 Claims, 21 Drawing Sheets

(51) Int. Cl.
*H04W 52/02* (2009.01)
*H04L 12/803* (2013.01)
*H04W 72/04* (2009.01)
*H04L 5/00* (2006.01)
*H04L 7/00* (2006.01)
*H04H 20/38* (2008.01)
*H04W 4/70* (2018.01)

(52) U.S. Cl.
CPC .............. *H04L 7/00* (2013.01); *H04L 47/125* (2013.01); *H04L 69/22* (2013.01); *H04W 52/0209* (2013.01); *H04W 72/042* (2013.01); *H04H 20/38* (2013.01); *H04L 5/0007* (2013.01); *H04L 5/0064* (2013.01); *H04W 4/70* (2018.02); *H04W 72/0453* (2013.01); *H04W 72/0473* (2013.01); *Y02D 30/70* (2020.08)

(56) References Cited

U.S. PATENT DOCUMENTS

| | | | |
|---|---|---|---|
| 2010/0029276 A1 | 2/2010 | Hwang | |
| 2010/0130218 A1 | 5/2010 | Zhang et al. | |
| 2012/0106495 A1* | 5/2012 | Yang | H04L 5/001 370/329 |
| 2013/0083749 A1 | 4/2013 | Xu et al. | |
| 2013/0188505 A1* | 7/2013 | Nory | H04L 5/0053 370/252 |
| 2014/0126403 A1* | 5/2014 | Siomina | H04W 24/10 370/252 |
| 2014/0301305 A1 | 10/2014 | Xu et al. | |
| 2015/0036645 A1* | 2/2015 | Shin | H04L 5/001 370/329 |
| 2015/0049741 A1 | 2/2015 | Chen et al. | |
| 2015/0358094 A1* | 12/2015 | Yi | H04B 17/318 370/252 |
| 2016/0050651 A1* | 2/2016 | Yuan | H04L 47/27 455/450 |
| 2016/0345347 A1* | 11/2016 | Cheng | H04L 5/001 |
| 2017/0034798 A1* | 2/2017 | Lin | H04L 5/001 |
| 2017/0196019 A1* | 7/2017 | Kim | H04W 74/002 |
| 2017/0238272 A1* | 8/2017 | You | H04W 56/0015 370/350 |
| 2017/0325236 A1* | 11/2017 | Yu | H04W 72/0453 |
| 2018/0006763 A1* | 1/2018 | Kim | H04L 1/0026 |
| 2018/0146465 A1* | 5/2018 | Li | H04W 72/04 |
| 2018/0241495 A1* | 8/2018 | Xue | H04L 5/0053 |
| 2018/0270008 A1* | 9/2018 | Yi | H04W 74/0833 |
| 2018/0278355 A1* | 9/2018 | Shin | H04L 27/2613 |

FOREIGN PATENT DOCUMENTS

| | | |
|---|---|---|
| KR | 20130107855 A | 10/2013 |
| WO | 2013055927 A1 | 4/2013 |
| WO | 2013169468 A1 | 11/2013 |
| WO | 2014165838 A2 | 10/2014 |
| WO | 2017019133 A1 | 2/2017 |

OTHER PUBLICATIONS

ISA/EP, International Search Report and Written Opinion of the International Searching Authority, Int'l Application No. PCT/US2016/049364, dated Feb. 2, 2017, European Patent Office, Rijswijk, NL, 21 pgs.

Panasonic, "MTC Narrowband Definition and Collision Handling", 3GPP TSG RAN WG1 Meeting #82, R1-153960, Beijing, China, Aug. 24-28, 2015, 6 pgs., XP051039358, 3rd Generation Partnership Project.

ISA/EPO, Partial International Search Report of the International Searching Authority, Int'l App. No. PCT/US2016/049364, dated Nov. 16, 2016, European Patent Office, Rijswijk, NL, 7 pgs.

ZTE, "Narrowband Definition and Frequency Hopping Patterns for MTC Enhancement," 3GPP TSG RAN WG1 Meeting #82, R1-154042, Beijing, China, Aug. 24-28, 2015, 8 pgs., XP051001433, 3rd Generation Partnership Project.

Qualcomm Incorporated: "New York Item: Narrow Band IOT (NB-IOT)", 3GPP TSG RAN Meeting #69, 3GPP Draft, Phoenix, USA, RP-151621, Sep. 14-16, 2015, 9 Pages, Section 4.1.

Taiwan Search Report—TW105127935—TIPO—dated Apr. 20, 2020.

* cited by examiner

COMMON SYNCHRONIZATION CHANNEL DESIGN FOR NARROWBAND COMMUNICATIONS

CROSS REFERENCES

The present Application for Patent claims priority to U.S. Provisional Patent Application No. 62/232,335 by Xu et al., entitled "Common Synchronization Channel Design for Narrowband Communications," filed Sep. 24, 2015, assigned to the assignee hereof, and is hereby expressly incorporated by reference herein in its entirety.

BACKGROUND

The following relates generally to wireless communication, and more specifically to a common synchronization channel design for device discovery for narrowband wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communications systems may provide for narrowband communication between wireless devices, such as those implementing machine-to-machine (M2M) communication or machine type communication (MTC). In some examples, MTC devices may have reduced complexity or reduced performance metrics and may be associated with narrowband communication, low cost operation, low power consumption, or the like. Signal processing using sampling rates appropriate for non-MTC devices may result in high processing complexity and power consumption relative to the capabilities of an MTC device. Thus, techniques for reducing processing complexity and power consumption may be beneficial for MTC devices.

SUMMARY

The described features generally relate to one or more improved systems, methods, and/or apparatuses for narrowband communication in a wireless communications system. In some aspects, a common synchronization signal, such as a primary synchronization signal (PSS), secondary synchronization signal (SSS), or physical broadcast channel (PBCH) may be transmitted within a single resource block in a narrowband transmission. Content of the common synchronization signal may indicate a location of narrowband data transmissions in a narrowband region of a system bandwidth. The location of the narrowband region may be, for example, in-band within one or more wideband transmissions, within a guard-band bandwidth adjacent to the wideband transmissions bandwidth, or within a stand-alone bandwidth that is non-adjacent to the wideband transmissions. The common synchronization signal may, in some examples, be located within a predefined search frequency and may include an anchor synchronization channel present in certain resources of allocated narrowband communications resources. Narrowband data region resources may be distributed in other portions of the narrowband communications resources, and may be allocated to different users to provide transmit diversity.

A method of wireless communication is described. The method may include identifying anchor resources within a wideband bandwidth of one or more wideband transmissions for transmission of at least a portion of a synchronization signal including synchronization information for device discovery, where the anchor resources include one or more resource blocks (RBs) located at a predefined resource location within the wideband bandwidth and transmitting at least a portion of the synchronization signal via the anchor resources.

An apparatus for wireless communication is described. The apparatus may include means for identifying anchor resources within a wideband bandwidth of one or more wideband transmissions for transmission of at least a portion of a synchronization signal including synchronization information for device discovery, where the anchor resources include one or more resource blocks (RBs) located at a predefined resource location within the wideband bandwidth and means for transmitting at least a portion of the synchronization signal via the anchor resources.

Another apparatus for wireless communication in is described. The apparatus may include a processor, memory in electronic communication with the processor, and instructions stored in the memory. The instructions may be operable to cause the processor to identify anchor resources within a wideband bandwidth of one or more wideband transmissions for transmission of at least a portion of a synchronization signal including synchronization information for device discovery, where the anchor resources include one or more resource blocks (RBs) located at a predefined resource location within the wideband bandwidth and transmit at least a portion of the synchronization signal via the anchor resources.

A non-transitory computer readable medium for wireless communication is described. The non-transitory computer-readable medium may include instructions operable to cause a processor to identify anchor resources within a wideband bandwidth of one or more wideband transmissions for transmission of at least a portion of a synchronization signal including synchronization information for device discovery, where the anchor resources include one or more resource blocks (RBs) located at a predefined resource location within the wideband bandwidth and transmit at least a portion of the synchronization signal via the anchor resources.

In some examples of the method, apparatus, and non-transitory computer-readable medium described above, the predefined resource location includes an RB located at a fixed offset from a center frequency of the wideband bandwidth. In some examples of the method, apparatus, and non-transitory computer-readable medium described above, the anchor resources may be used to transmit one or more of the synchronization signal, a physical broadcast channel (PBCH), or a system information block (SIB) for use in device discovery.

In some examples of the method, apparatus, and non-transitory computer-readable medium described above, the anchor resources include the anchor resources include information indicating second resources for narrowband transmissions, and where the second resources may be selected to provide one or both of frequency diversity or load balancing. In some examples of the method, apparatus, and non-transitory computer-readable medium described above, the second resources may be located in a different narrowband region than the anchor resources.

In some examples of the method, apparatus, and non-transitory computer-readable medium described above, one or more of a periodicity or a power spectral density (PSD) of the synchronization signal may be determined based on a location of the anchor resources. In some examples of the method, apparatus, and non-transitory computer-readable medium described above, the synchronization signal includes physical broadcast channel (PBCH) information, and where content of the PBCH information indicates a location of the narrowband region within the wideband bandwidth, within a guard-band bandwidth adjacent to the wideband bandwidth, or within a stand-alone bandwidth that may be independent of the wideband bandwidth.

In some examples of the method, apparatus, and non-transitory computer-readable medium described above, the PBCH includes one or more of an indication of the location of the narrowband region, a modified system frame number for the narrowband transmissions, or SIB information, and where the indication includes one or more of a direct indication of the location of the narrowband region. In some examples of the method, apparatus, and non-transitory computer-readable medium described above, the anchor resources may be used to transmit a physical downlink control channel, where the physical downlink control channel includes one or more of an indication of a location of the narrowband region, a modified system frame number for the narrowband transmissions, or SIB information.

In some examples of the method, apparatus, and non-transitory computer-readable medium described above, the anchor resources include a plurality of symbols of an RB punctured by a legacy reference signal. In some examples of the method, apparatus, and non-transitory computer-readable medium described above, the anchor resources may be selected to avoid resource locations for one or more of a legacy reference signal or legacy control signal.

Some examples of the method, apparatus, and non-transitory computer-readable medium described above may further include processes, features, means, or instructions for identifying that a location of the narrowband region may be in-band within the wideband bandwidth. Some examples of the method, apparatus, and non-transitory computer-readable medium described above may further include processes, features, means, or instructions for selecting narrowband resources distributed in the wideband bandwidth for transmission of the narrowband transmissions, the narrowband resources distributed to provide transmit diversity.

A method of wireless communication is described. The method may include identifying anchor resources within a wideband bandwidth of one or more wideband transmissions that contain at least a portion of a synchronization signal including synchronization information for device discovery, where the anchor resources include one or more resource blocks (RBs) located at a predefined resource location within the wideband bandwidth and receiving at least a portion of the synchronization signal via the anchor resources.

An apparatus for wireless communication is described. The apparatus may include means for identifying anchor resources within a wideband bandwidth of one or more wideband transmissions that contain at least a portion of a synchronization signal including synchronization information for device discovery, where the anchor resources include one or more resource blocks (RBs) located at a predefined resource location within the wideband bandwidth and means for receiving at least a portion of the synchronization signal via the anchor resources.

Another apparatus for wireless communication in a system is described. The apparatus may include a processor, memory in electronic communication with the processor, and instructions stored in the memory. The instructions may be operable to cause the processor to identify anchor resources within a wideband bandwidth of one or more wideband transmissions that contain at least a portion of a synchronization signal including synchronization information for device discovery, where the anchor resources include one or more resource blocks (RBs) located at a predefined resource location within the wideband bandwidth and receive at least a portion of the synchronization signal via the anchor resources.

A non-transitory computer readable medium for wireless communication is described. The non-transitory computer-readable medium may include instructions operable to cause a processor to identify anchor resources within a wideband bandwidth of one or more wideband transmissions that contain at least a portion of a synchronization signal including synchronization information for device discovery, where the anchor resources include one or more resource blocks (RBs) located at a predefined resource location within the wideband bandwidth and receive at least a portion of the synchronization signal via the anchor resources.

In some examples of the method, apparatus, and non-transitory computer-readable medium described above, the predefined resource location includes an RB located at a fixed offset from a center frequency of the wideband bandwidth. In some examples of the method, apparatus, and non-transitory computer-readable medium described above, the anchor resources may be used to receive one or more of the synchronization signal, a physical broadcast channel (PBCH), or a system information block (SIB) for use in initial acquisition of the narrowband transmissions.

In some examples of the method, apparatus, and non-transitory computer-readable medium described above, the anchor resources include information indicating second resources for narrowband transmissions, and where the second resources may be selected to provide one or both of frequency diversity or load balancing. In some examples of the method, apparatus, and non-transitory computer-readable medium described above, the second resources may be located in a different narrowband region than the anchor resources.

Some examples of the method, apparatus, and non-transitory computer-readable medium described above may further include processes, features, means, or instructions for communicating using the second resources. Some examples of the method, apparatus, and non-transitory computer-readable medium described above may further include processes, features, means, or instructions for periodically checking the anchor resources based at least in part on a SIB change.

In some examples of the method, apparatus, and non-transitory computer-readable medium described above, one or more of a periodicity or a power spectral density (PSD) of the synchronization signal may be determined based on a location of the anchor resources. In some examples of the method, apparatus, and non-transitory computer-readable medium described above, the synchronization signal includes physical broadcast channel (PBCH) information, and where content of the PBCH information indicates a location of the narrowband region within the wideband bandwidth, within a guard-band bandwidth adjacent to the wideband bandwidth, or within a stand-alone bandwidth that may be independent of the wideband bandwidth.

In some examples of the method, apparatus, and non-transitory computer-readable medium described above, the PBCH includes one or more of an indication of the location of the narrowband region, a modified system frame number for the narrowband transmissions, or SIB information, and where the indication includes one or more of a direct indication of the location of the narrowband region. In some examples of the method, apparatus, and non-transitory computer-readable medium described above, the anchor resources may be used to receive a physical downlink control channel, where the physical downlink control channel includes one or more of an indication of a location of the narrowband region, a modified system frame number for the narrowband transmissions, or SIB information.

In some examples of the method, apparatus, and non-transitory computer-readable medium described above, the anchor resources include a plurality of symbols of an RB punctured by a legacy reference signal. In some examples of the method, apparatus, and non-transitory computer-readable medium described above, the anchor resources may be selected to avoid resource locations for one or more of a legacy reference signal or legacy control signal.

Some examples of the method, apparatus, and non-transitory computer-readable medium described above may further include processes, features, means, or instructions for identifying, based at least in part on a format of the synchronization signal, that a location of the narrowband region may be in-band within a wideband bandwidth of one or more wideband transmission. Some examples of the method, apparatus, and non-transitory computer-readable medium described above may further include processes, features, means, or instructions for identifying narrowband resources distributed in the wideband bandwidth for receiving the narrowband transmissions, the narrowband resources distributed to provide transmit diversity for the narrowband transmissions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
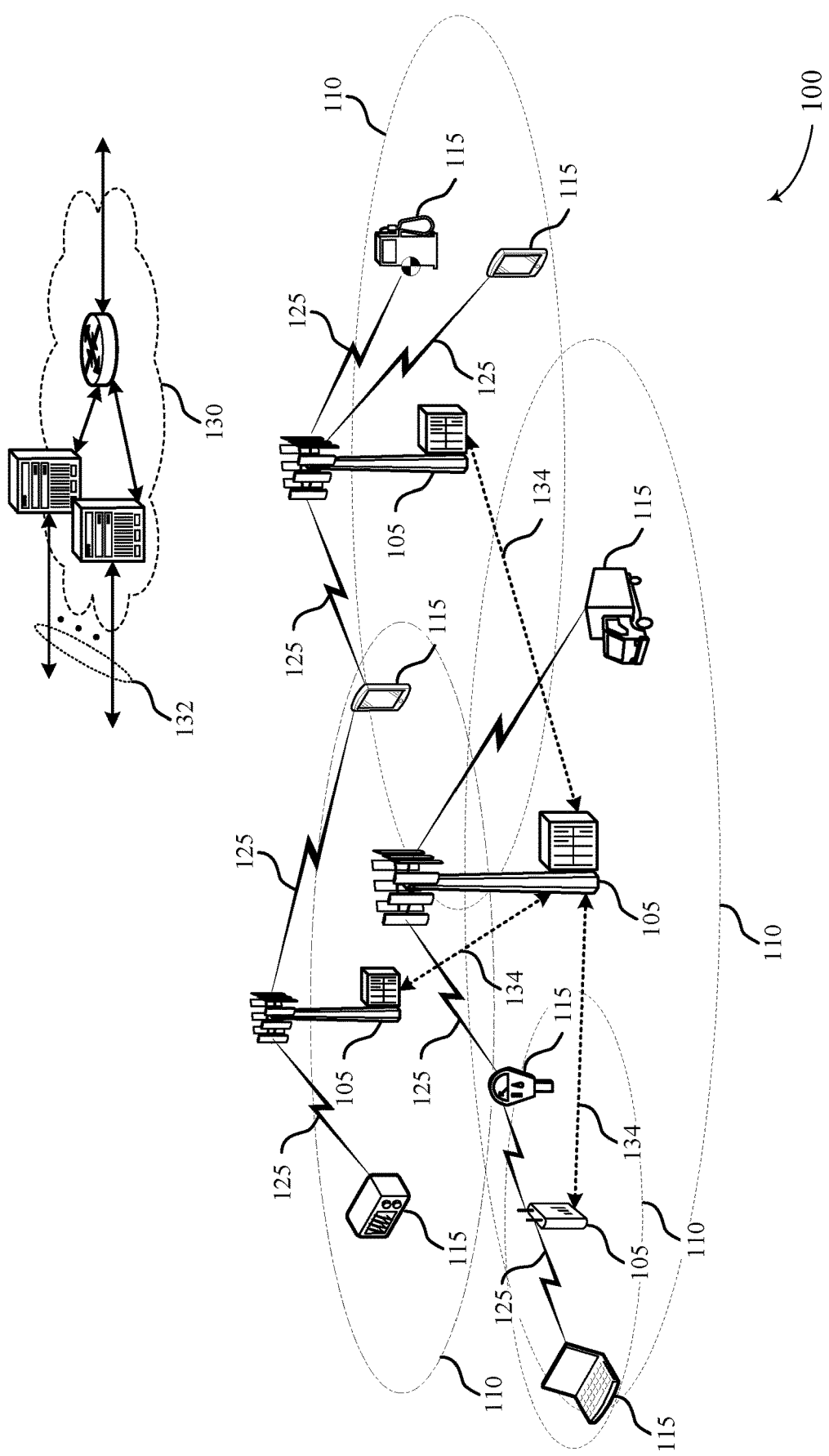
FIG. 1 illustrates an example of a wireless communications system that supports a common synchronization channel design for narrowband communications in accordance with aspects of the present disclosure.

Techniques are described for machine-to-machine (M2M) communication that may utilize a narrowband region of a system bandwidth. The narrowband region of the system bandwidth may be, for example, a single resource block of a wideband transmission that is transmitted in-band with other wideband transmissions. In other examples, the narrowband region of the system bandwidth may be located in a guard-band that is adjacent to a wideband transmission bandwidth, or may be located in a stand-alone frequency bandwidth that is not adjacent to the wideband transmission bandwidth. Various aspects of the disclosure set forth a synchronization channel that may be used by devices, such as a user equipment (UE), to discover available wireless communications networks, along with information for the device to initiate communications with a discovered network.

The synchronization channel may be located, for example, in a predefined or preprogrammed location, which may allow for reduced complexity of a UE through reduction of initial search complexity. In some examples, an anchor synchronization channel may be provided at predefined or preprogrammed locations (e.g., frequency ranges within a system bandwidth), and devices may monitor the anchor synchronization channel to acquire at least a portion of the synchronization signal. Resources for narrowband data transmissions may be distributed through other resources of the system bandwidth, which may provide load balancing and transmit diversity (e.g., frequency and/or time diversity) for narrowband transmissions.

According to some examples, content of the synchronization channel may provide an indication of the location of the narrowband region, such as whether the narrowband region is in-band, stand-alone, or within a guard-band. Such content may include information in a primary synchronization signal (PSS), a secondary synchronization signal (SSS), a physical broadcast channel (PBCH), or combinations thereof. The synchronization channel also may be, in various aspects of the disclosure, compatible with legacy signals used for wideband transmissions, such as legacy long term evolution (LTE) control channel or reference signals. In some examples, a power spectral density (PSD) or periodicity of narrowband communications may be determined based on the location of the narrowband transmissions.

As mentioned, various aspects of the disclosure provide techniques for M2M communication, or machine type communication (MTC). M2M or MTC refers to data communication technologies that allow automated devices to communicate with one another with little or no human intervention. For example, M2M or MTC may refer to communications from a device that integrate sensors or meters to measure or capture information and relay that information to a central server or application program that can make use of the information or present the information to humans interacting with the program or application. Such a device may be called a M2M device, an MTC device, an MTC UE, and/or simply a UE.

In some cases, networks of MTC devices communicating to each other or one or more servers may be referred to as the Internet of Things (IoT). In instances where the communication is performed over a cellular network, this may be referred to as a cellular IoT (CIoT). In some deployments, CIoT devices may communicate using a relatively small portion of allocated bandwidth of a cellular network, which may be referred to as narrowband communication. For example, the narrowband communication may be designed to occupy one resource block (RB) of an LTE wideband transmission. In other examples, the narrowband communications may occupy more resources than one RB, but less than a full amount of an available LTE transmission bandwidth. Other portions of the allocated bandwidth, or system bandwidth, of the cellular network may be used for communications that have higher data rates and are referred to as wideband communications herein. In some examples, the narrowband communications may occupy 200 kilohertz (kHz) of a radio frequency spectrum band, as compared to 1.4 megahertz (MHz) to 20 MHz of an LTE wideband bandwidth.

In some deployments, MTC devices may have a 164 dB minimum coupling loss (MCL), which may be achieved through relatively high PSD. MTC devices may have relatively high power efficiency requirements, and MTC networks may routinely support a relatively large number of devices (e.g., a relatively large number of water meters, gas meters, electric meters in a given area). MTC devices may be designed to have a relatively low cost as well, and thus may have hardware components that are specifically designed to operate in a power efficient manner and that do not have a significant amount of processing capabilities beyond what is used for narrowband communications. As mentioned above, in some deployments, such MTC devices may operate with a 200 kHz channelization.

In order to provide for efficient device discovery and synchronization using narrowband communications, some aspects provide a synchronization signal, such as a PSS, SSS, or PBCH, that is transmitted within the single resource block. The synchronization signal may be transmitted, for example, using multiple orthogonal frequency division multiplexing (OFDM) symbols within the single RB. In certain aspects of the disclosure, a base station may transmit, and a UE may receive, an indication of a location of the single resource block for narrowband transmissions within a wideband region of the system bandwidth. The UE may identify one or more synchronization parameters for receiving the narrowband transmissions based on the indication. The UE may, in some examples, identify that the narrowband resources are located in-band or in a stand-alone bandwidth based on a sequence transmitted in the PSS, SSS, PBCH, or combinations thereof.

Aspects of the disclosure are initially described in the context of a wireless communication system. Specific examples are then described for narrowband MTC communications in an LTE system. These and other aspects of the disclosure are further illustrated by and described with reference to apparatus diagrams, system diagrams, and flowcharts that relate to common synchronization channel design for device discovery for narrowband wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, an MTC or M2M device, a CIoT device, or some other suitable terminology. A UE 115 may also be a cellular phone, a wireless modem, a handheld device, a personal computer, a tablet, a personal electronic device, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

As mentioned above, some types of wireless devices may provide for automated communication. Automated wireless devices may include those implementing M2M communication or MTC. M2M or MTC, as mentioned above, may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application.

Some UEs 115 may be MTC devices, such as those designed to collect information or enable automated behavior of machines. Examples of applications for MTC devices include smart metering, smart switches, inventory monitoring, water level monitoring, equipment monitoring, healthcare monitoring, wildlife monitoring, weather and geological event monitoring, fleet management and tracking, remote security sensing, physical access control, and transaction-based business charging, to name but a few examples. An MTC device may operate using half-duplex (one-way) communications at a reduced peak rate. MTC devices may also be configured to enter a power saving "deep sleep" mode when not engaging in active communications. According to various aspects of the present disclosure, MTC devices may operate using narrowband communications that may be located within a bandwidth of other wideband communications, within a guard-band associated with the wideband communications, or outside of the bandwidth of other wideband communications. In cases where the narrowband communications are located in a guard-band or otherwise outside of other wideband communications, the narrowband communications may be referred to as having a stand-alone bandwidth.

As mentioned above, various aspects of the disclosure provide techniques for device discovery and synchronization using narrowband communications. In some examples, a UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as time division duplex (TDD) systems, may transmit an SSS but not a PSS. Both the PSS and the SSS, according to established wideband techniques, may be located in the central 62 and 72 subcarriers of a carrier, respectively.

In certain aspects of the present disclosure, the PSS and the SSS may be located within a single RB, as compared to some wideband deployments that may have a single OFDM symbol with PSS or SSS within a single RB. After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, a physical uplink control channel (PUCCH), a physical uplink shared channel (PUSCH), power control, sounding reference signal (SRS), and cell barring. After completing initial cell synchronization, a UE 115 may decode the MIB, SIB1 and SIB2 prior to accessing the network. The MIB may be transmitted on PBCH and may carry pieces of information for UE initial access, including DL channel bandwidth in term of RBs, PHICH configuration (duration and resource assignment), and SFN. A new MIB may be broadcast periodically and rebroadcast every frame (10 ms). After receiving the MIB, a UE may receive one or more SIBs.

Different SIBs may be defined according to the type of system information conveyed. SIB1 may include access information, including cell identity information, and it may indicate whether a UE 115 is allowed to camp on a cell. SIB1 may also include cell selection information (or cell selection parameters). Additionally, SIB1 includes scheduling information for other SIBs. SIB2 may be scheduled dynamically according to information in SIB1, and may include access information and parameters related to common and shared channels. The periodicity of SIB2 can be set to, for example, 8, 16, 32, 64, 128, 256, or 512 radio frames.

LTE systems may utilize OFDMA on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kHz for a corresponding system bandwidth (with guardband) of 1.4, 3, 5, 10, 15, or 20 MHz, respectively. The system bandwidth may also be partitioned into sub-bands. For example, a sub-band may cover 1.08 MHz, and there may be 1, 2, 4, 8 or 16 sub-bands. As mentioned above, in examples that provide MTC communications using narrowband resources, corresponding narrowband bandwidth may be 200 kHz, which may include 180 kHz of subcarriers and a 20 kHz guard band. In such examples, the narrowband communications may occupy a single RB of an LTE system bandwidth, and there may be 12 sub-carriers.

A frame structure may be used to organize physical resources. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS), also referred to as a common reference signal, and a UE-specific RS (UE-RS). UE-RS may be transmitted on the resource blocks associated with physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be.

As mentioned, base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115.

In addition to CRS, which may be utilized by all UEs 115 in the coverage area 110 of the base station 105, demodulation reference signal (DMRS) may be directed toward specific UEs 115 and may be transmitted on resource blocks assigned to those UEs 115. DMRS may include signals on six resource elements in each resource block in which they are transmitted. The DM-RS for different antenna ports may each utilize the same six resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating channel state information (CSI). On the UL, a UE 115 may transmit a combination of periodic SRS and UL DMRS for link adaptation and demodulation, respectively. DMRS transmissions may be precoded according to a particular precoding matrix indicator (PMI) for a particular UE 115. In some examples, when transmitting narrowband communications, a base station 105 may apply a same precoding matrix to transmissions in the single RB narrowband communication, which may allow a UE 115 to receive the signal without relying on a CRS transmission.

Various aspects of the disclosure provide techniques for narrowband communications in a LTE wireless communications network. In some aspects, narrowband MTC communications may be transmitted using a single RB of a number of RBs used for wideband LTE communications. In order to provide for efficient device discovery and synchronization using narrowband communications, some aspects provide a synchronization signal, such as a PSS or an SSS, that is transmitted within the single RB. The synchronization signal may be located, for example, in a predefined or preprogrammed location, which may allow for reduced complexity of a UE through reduction of initial search complexity.

In some examples, an anchor synchronization channel may be provided at predefined or preprogrammed locations (e.g., wireless transmission resources within a system bandwidth), and devices may monitor the anchor synchronization channel to acquire at least a portion of the synchronization signal. Resources for narrowband data transmissions may be distributed through other resources of the system bandwidth, which may provide load balancing and transmit diversity (e.g., frequency and/or time diversity) for narrowband transmissions. According to some examples, content of the synchronization channel may provide an indication of the location of the narrowband region, such as whether the narrowband region is in-band, stand-alone, or within a guard-band. Such content may include information in a PSS, an SSS, a PBCH, or combinations thereof. The synchronization channel also may be, in various aspects of the disclosure, compatible with legacy signals used for wideband transmissions, such as legacy LTE control channel or reference signals. In some examples, a PSD or periodicity of narrowband communications may be determined based on the location of the narrowband transmissions.

Figure 2:
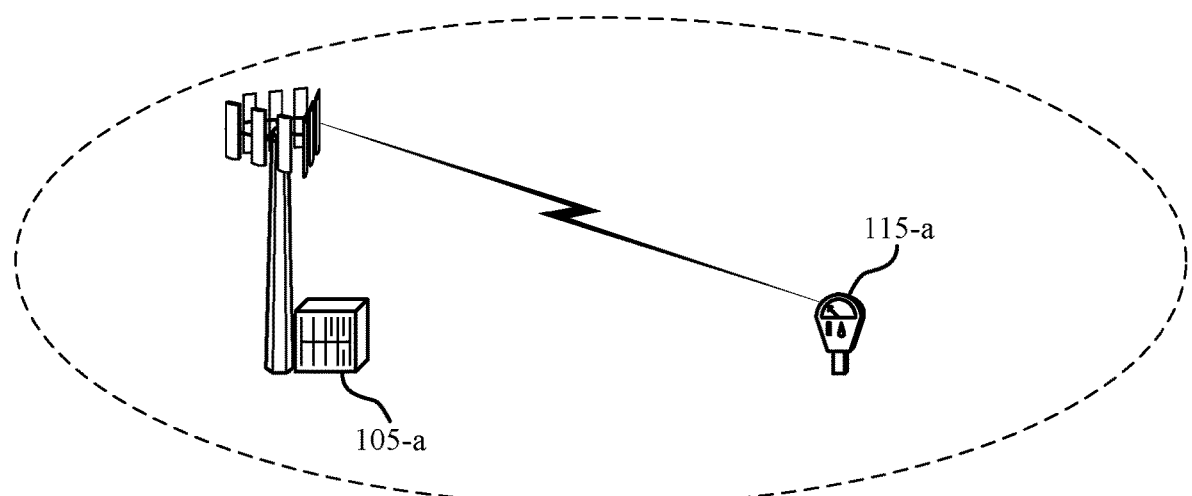
FIG. 2 illustrates an example of a wireless communications system that supports a common synchronization channel design for narrowband communications in accordance with aspects of the present disclosure.

FIG. 2 illustrates an example of a wireless communications system 200 that may employ common synchronization channel design for device discovery for narrowband wireless communications in accordance with various aspects of the present disclosure. Wireless communications system 200 may include a UE 115-a and base station 105-a, which may be examples of a UE 115 base station 105 described with reference to FIG. 1.

In some examples, UE 115-a is an MTC device, such as a smart meter, that may communicate with base station 105-a using narrowband communications. In order to perform device discovery and synchronization, base station 105-a may generate a synchronization signal, such as a PSS, SSS, or PBCH, and transmit the synchronization signal using narrowband resources. The UE 115-a may receive the synchronization signal and synchronize one or more parameters of transmissions in the narrowband region based thereon. In some examples, decoding of the synchronization signals may depend upon whether the narrowband transmission is located in-band within a transmission bandwidth of a wideband transmission (e.g., an LTE RB in a wideband LTE transmission), or located outside of the wideband transmission bandwidth (e.g., in a stand-alone bandwidth). In cases where the narrowband transmission is in-band within the wideband transmission bandwidth, the base station 105-a may identify a location of the RB and transmit an indication of the location to the UE 115-a. Such an indication may include, in some examples, a total wideband bandwidth of the system bandwidth and an RB index that indicates a location of the single RB. In other examples, the indication may simply indicate an RB offset from the start of the wideband bandwidth.

Figure 3:
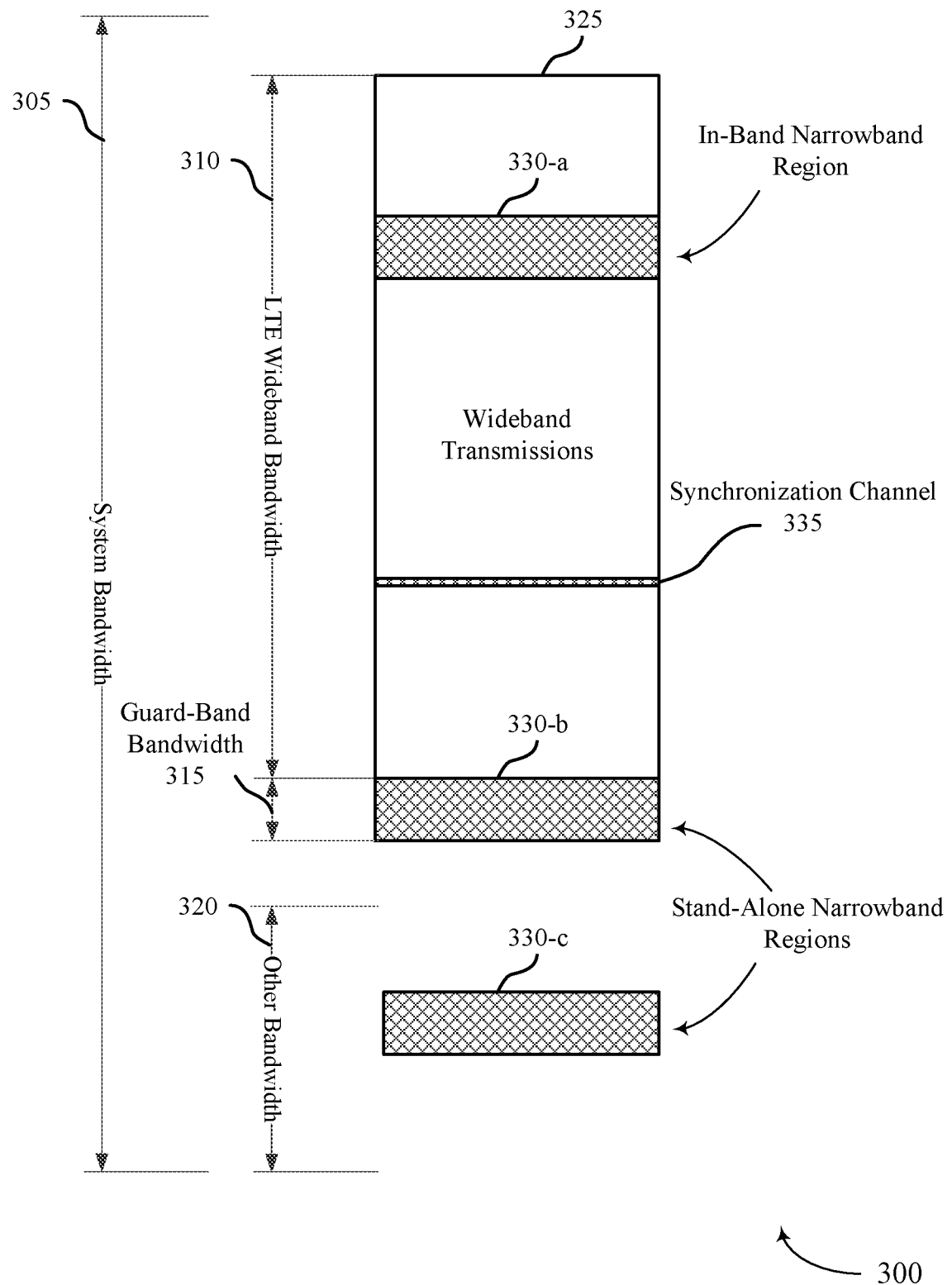
FIG. 3 illustrates an example of narrowband regions within a system bandwidth that supports a common synchronization channel design for narrowband communications in accordance with aspects of the present disclosure.

FIG. 3 illustrates an example 300 of narrowband regions within a system bandwidth that support downlink and synchronization techniques for narrowband wireless communications in accordance with various aspects of the present disclosure. Example 300 may be used by wireless network devices, such as UEs 115 and base stations 105 described with reference to FIGS. 1-2 that may operate using narrowband communications.

In the example of FIG. 3, a total system bandwidth 305 may include a range of frequencies that a device, such as a base station 105 or UE 115, may use for wireless communications. The system bandwidth 305 may include an LTE wideband bandwidth 310, one or more guard-band bandwidth(s) 315 (e.g., a 1 MHz band located at the edge of a 20 MHz wideband LTE bandwidth), or other bandwidth(s) 320 (e.g., bandwidth associated with a Global System for Mobile communications (GSM) system). LTE wideband bandwidth 310 may include a wideband data region 325 that may be used for wideband transmissions, and that may include a first narrowband region 330-a (e.g., an in-band narrowband region) and a synchronization channel 335.

A second narrowband region 330-b may be provided for stand-alone narrowband communications in a guard-band bandwidth 315 that is adjacent to the LTE wideband bandwidth 310. A third narrowband region 330-c also may be provided for stand-alone narrowband communication and may be located in some other bandwidth 320, such as a bandwidth allocated for GSM communications, for example. According to various examples described herein, the term in-band may be used to refer to a 180 kHz design that may fit into a wideband bandwidth (e.g., within the signal portion of a 20 MHz LTE wideband bandwidth), the term guard-band may be used to refer to a 180 kHz design that may fit into the guard-band region of a wideband bandwidth (e.g., the 1 MHz edge of a 20 MHz LTE wideband bandwidth), and the term stand-alone may refer to a 180 kHz design that may fit into a 200 kHz of total bandwidth.

In some examples, first narrowband region 330-a, second narrowband region 330-b, and third narrowband region 330-c may include resources that would occupy a single RB (e.g., 12 subcarriers) of wideband data region 325. In one example, (e.g., for a 20 MHz carrier) wideband data region 325 may include 100 RBs (1200 subcarriers). The particular narrowband region 330-a, 330-b, or 330-c may be configured for narrowband communications based on various deployment parameters, such as the availability of one or more frequency bands that are outside of LTE wideband bandwidth 310, the usage of the LTE wideband bandwidth 310 by other devices, to name but two examples.

In some examples, synchronization channel 335 may be a common synchronization channel that may be used irrespective of whether narrowband data transmissions use resources in the first narrowband region 330-a, the second narrowband region 330-b, or the third narrowband region 330-c. In some examples, the synchronization channel 335 may fit into an 180 kHz subcarrier, and may minimize interference to other devices that operate using the system bandwidth 305, such as other base stations 105 or UEs 115. The synchronization channel 335, in some examples, may also allow for backward compatibility with in-band deployments, which may result in reduced power consumption for UEs 115 searching for the synchronization channel 335. The synchronization channel 335 of various aspects of the present disclosure may provide capability for UEs 115 to search for and receive synchronization signals (e.g., PSS/SSS/PBCH) with relatively low power, relatively low processing complexity, over relatively large coverage areas, and with the ability to handle a large initial frequency offsets.

Figure 4:
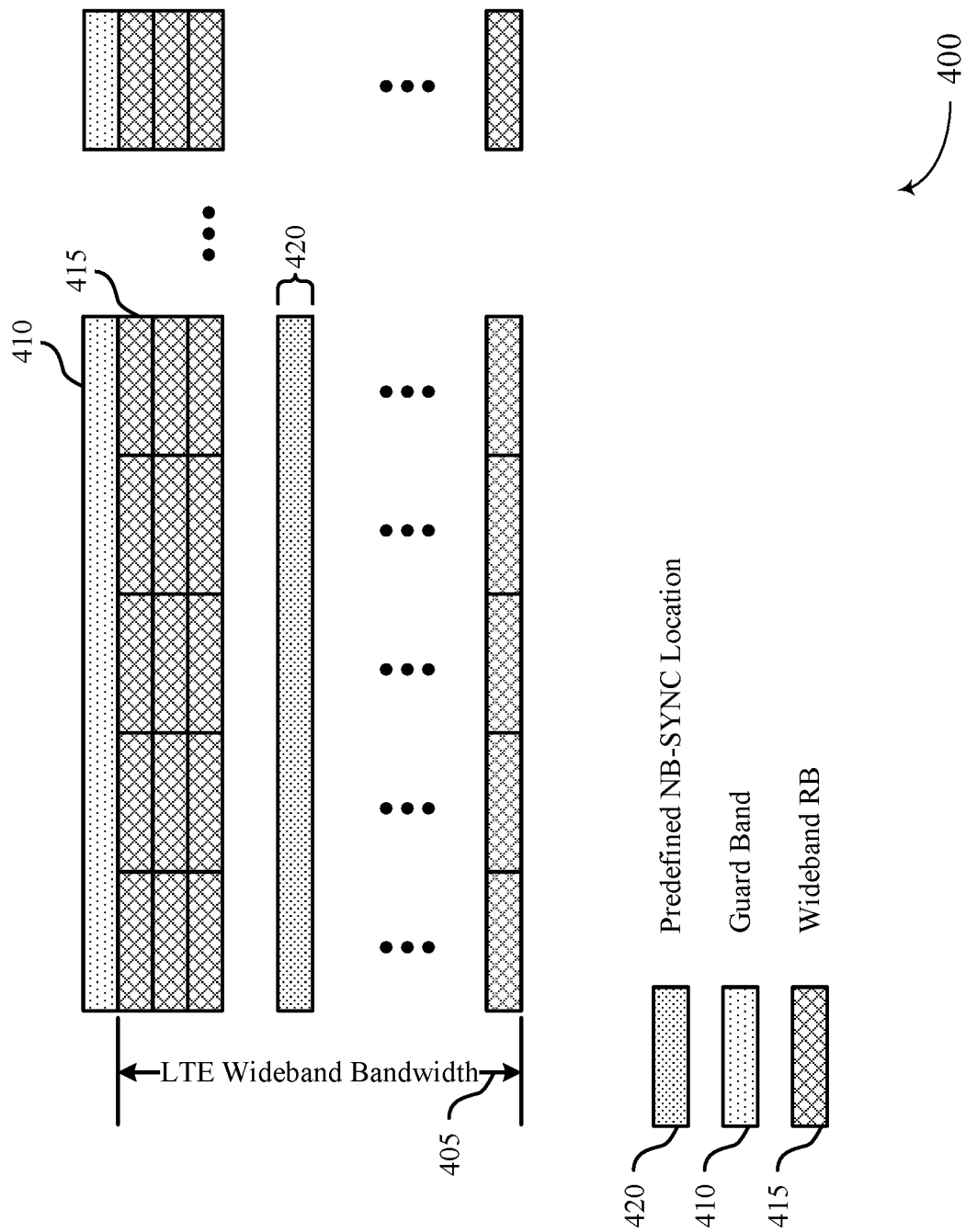
FIG. 4 illustrates an example of a system bandwidth and placement of a narrowband synchronization channel that supports a common synchronization channel design for narrowband communications in accordance with aspects of the present disclosure.

FIG. 4 illustrates an example 400 of a system bandwidth and placement of a narrowband synchronization channel within a wideband bandwidth, in accordance with various aspects of the present disclosure. Example 400 may be used by wireless network devices, such as UEs 115 and base stations 105 described with reference to FIGS. 1-2. In some deployments, a number of RBs 415 (e.g., wideband RBs) may be used for wideband transmissions between a base station 105 and various UEs 115, such as according to legacy LTE communications. Narrowband MTC-type UEs 115 may be configured to receive a subset of the communications using a narrowband region of a system bandwidth, which may include an LTE wideband bandwidth 405 and a guard-band bandwidth 410.

In some examples, the system bandwidth may also include a separate stand-alone bandwidth, such as discussed above with respect to FIG. 3. In some examples, narrowband communications may be transmitted in the guard-band bandwidth 410. In other examples, the narrowband communications may be transmitted in configured RBs 415 for narrowband transmissions, which may be signaled by a base station 105 to UEs 115 that may be served by the base station 105. In some examples, irrespective of the location of the narrowband transmissions, a narrowband synchronization signal may be provided using predefined or preprogrammed narrowband synchronization (NB-SYNC) channel resources 420.

A UE 115 that receives communications, according to various aspects of the disclosure may be configured to identify narrowband synchronization channel resources 420 and perform a search for synchronization signals within the narrowband synchronization channel resources 420. For example, a location of the narrowband synchronization channel resources 420 within the LTE wideband bandwidth 405 may be defined in a specification. In other examples, a UE 115 may be programmed to perform a search for synchronization signals within the narrowband synchronization channel resources 420 by a network operator associated with the UE 115.

In some cases, a predefined RB mapping may be used to reduce the search complexity for a UE 115 when attempting to locate the synchronization channel within the narrowband synchronization channel resources 420. For example, with in-band deployments, if any RB 415 can be selected for transmitting the synchronization channel, a number of additional "raster" searches may be prohibitive to the UE 115. Thus, an anchor narrowband synchronization (NB-SYNC) channel may be predefined with a fixed offset from a center frequency of the LTE wideband bandwidth 405. In some examples, UEs 115 may begin a search with a fixed offset from center raster pattern, and the search may be indifferent to the overall LTE wideband bandwidth 405 if starting from within the center six RBs, or just outside of six physical resource blocks (PRBs). In some cases, collisions with the PSS, the SSS, or the PBCH may be avoided by beginning a search outside of the six PRBs.

In some examples, an anchor synchronization channel may be used to reduce transmission overhead. When multiple narrowband regions are used for in-band or standalone deployments, it may be inefficient to transmit synchronization channels and broadcast channels for all of the regions. Thus, an anchor synchronization channel within the NB-SYNC channel, a narrowband PBCH (NB-PBCH), and/or a narrowband system information bloc (NB-SIB) may be used for initial acquisition. For example, UEs 115 may begin a search from the anchor synchronization channel. In some cases, the UEs 115 may be retuned or redistributed to other data regions (e.g., narrowband Internet-of-Things (NB-IoT) data regions) for load balancing. In some cases, UEs 115 may periodically check the anchor synchronization channel or be paged about changes in the SIB.

Through the reuse of an LTE RB for narrowband communications, various higher layers of LTE systems, along with hardware of such systems, may be utilized in an efficient manner without a significant amount of additional overhead. Such techniques may also avoid fragmentation (e.g., a device could implement communications techniques that use differing amounts of transmission bandwidth). When using a narrowband signal that occupies a single RB, a UE 115 may perform a cell search using the narrowband signal, and thus a UE 115 might not know that a configured RB for narrowband communications is placed inside the LTE wideband bandwidth 405, or if the RB is transmitted in a stand-alone deployment in a frequency band that is not within the LTE wideband bandwidth 405. Furthermore, even when a single RB is reserved for narrowband communications within LTE wideband bandwidth 405, some legacy LTE signals may still be transmitted in this RB, such as CRS tones used by legacy UEs for tracking loops.

Legacy control regions (e.g., a physical downlink control channel (PDCCH)) also may be present in such a single RB for legacy UEs. In standalone configurations, there is no need to transmit these signals, as legacy UEs would not be served in such configurations. In some aspects of the disclosure, narrowband communications, including narrowband data and narrowband synchronization signals, may be transmitted using resources that do not interfere with legacy LTE control or reference signals. Various aspects of the disclosure, as will be discussed in more detail below, provide synchronization signals (e.g., PSS and SSS) and PBCH signals that may allow a UE 115 to perform device discovery and synchronization using narrowband transmissions in multiple different types of deployments.

Figure 5:
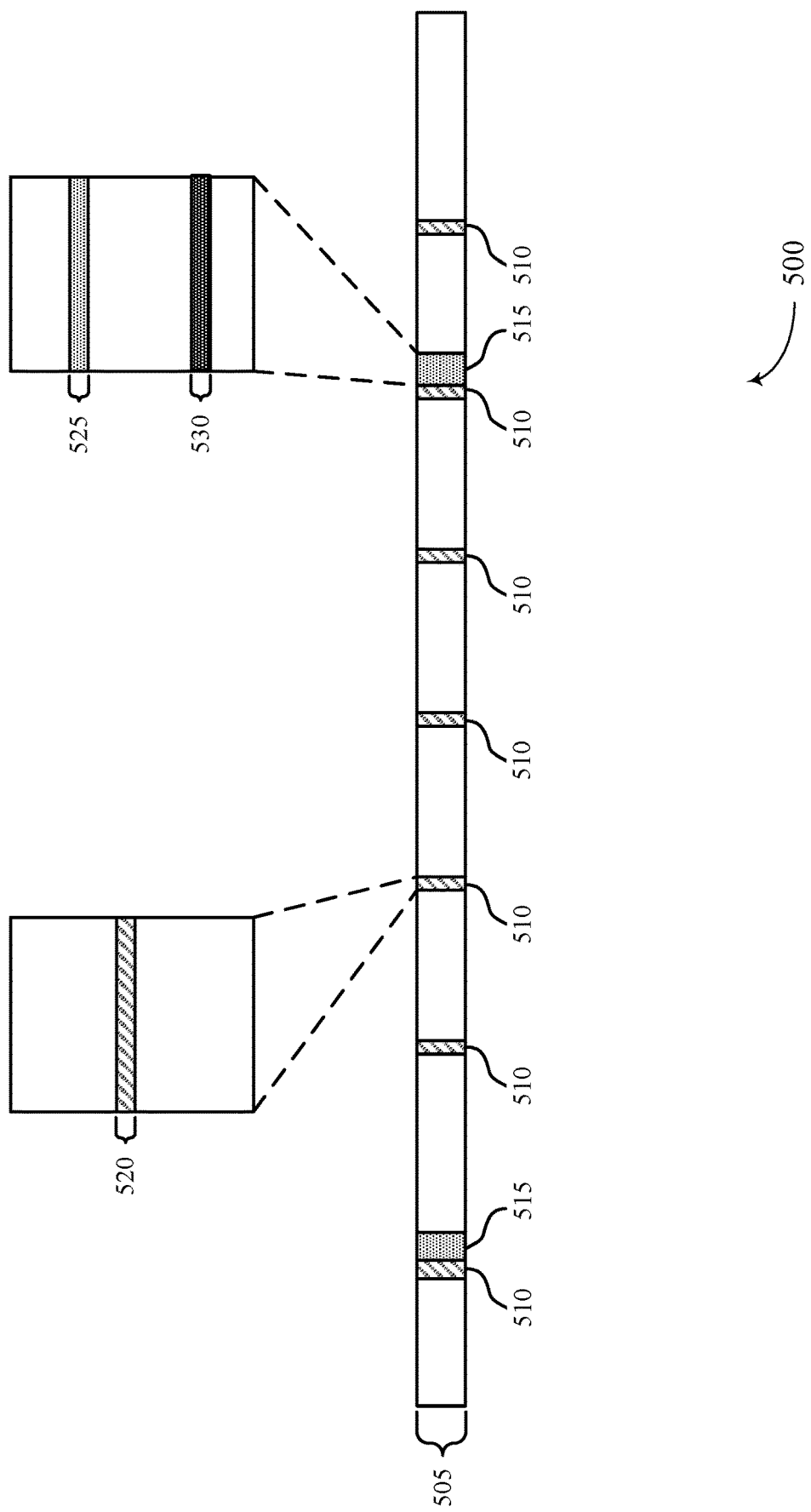
FIG. 5 illustrates an example of an allocation of narrowband resources for narrowband data transmissions and a common synchronization channel in accordance with aspects of the present disclosure.

FIG. 5 illustrates an example 500 of an allocation of narrowband resources for narrowband transmissions and a common synchronization channel in accordance with various aspects of the present disclosure. Example 500 may be used by wireless network devices, such as UEs 115 and base stations 105 described with reference to FIGS. 1-2. In some examples, for multiple narrowband regions within a bandwidth 505, such as an in-band bandwidth or stand-alone bandwidth, it may be inefficient to transmit synchronization channels and broadcast channels in each of the narrowband resources. In some examples, such as example 500, some narrowband resources may be utilized for synchronization channel transmission, and remaining narrowband resources may be used for data communications.

In the example 500 of FIG. 5, an anchor synchronization channel 520 may be transmitted in a periodic subset 510 of narrowband resources. The anchor synchronization channel 520 (NB-SYNC) may also provide NB-PBCH and NB-SIB for initial acquisition by a UE 115. The narrowband resources also include periodic data transmission regions 515, which may include a first set of narrowband resources 525 and a second set of narrowband resources 530. The first set of narrowband resources 525 may provide resources having frequency diversity from the second set of narrowband resources 530. In such a manner, a first group of narrowband devices may use the first set of narrowband resources 525 during a first time period, and may use the second set of narrowband resources 530 during a second time period, so as to provide frequency diversity in transmissions to the first group of narrowband devices. Similarly, a second group of narrowband devices may use the second set of narrowband resources 530 during the first time period, and may use the first set of narrowband resources 525 during the second time period, so as to provide frequency diversity in transmissions to the second group of narrowband devices.

All of the devices thus may start from the anchor synchronization channel 520, and then be retuned and/or redistributed to other narrowband resources 525 and 530 for transmit diversity. Additionally, such distribution of devices to other narrowband resources 525 and 530 may provide load balancing. A narrowband UE 115, in some examples, may periodically check the anchor synchronization channel located in anchor resources 520 for a SIB change, or may be paged in the event of a SIB change. In some cases, UEs 115 may have one reception antenna, and the use of one RB in narrowband communications may not provide an opportunity for diversity in communications. However, a distribution of narrowband resources, such as in example 400, may allow retuning and frequency hopping among different narrowband data regions to achieve frequency diversity. In some examples, additional transmit diversity may be considered, such as a space frequency blocking code (SFBC) from a base station 105.

Figure 6:
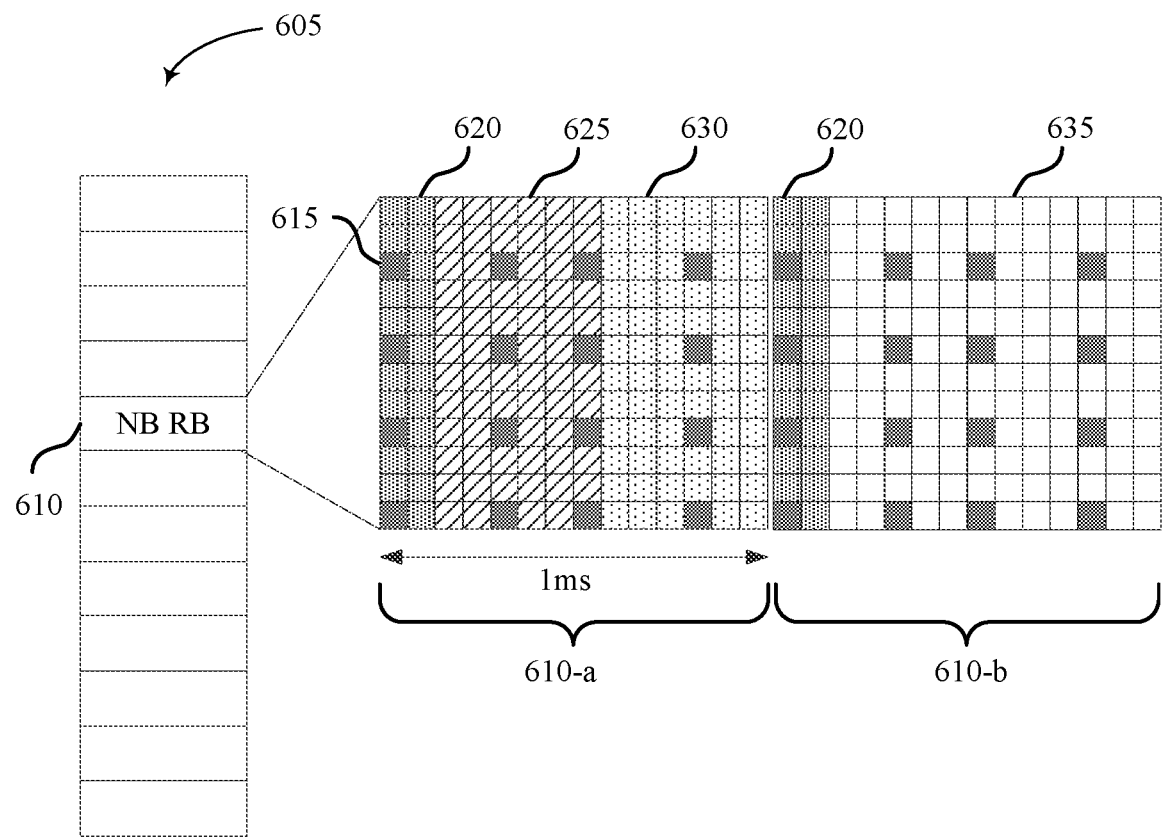
FIG. 6 illustrates an example of a resource element mapping that supports synchronization channel techniques for narrowband wireless communications in accordance with aspects of the present disclosure.
Figure 6:
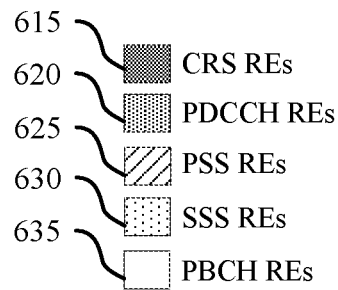

FIG. 6 illustrates an example of a resource element mapping 600 that supports synchronization channel techniques for narrowband wireless communications, in accordance with various aspects of the present disclosure. Resource element mapping 600 may be used by wireless network devices, such as UEs 115 and base stations 105 described with reference to FIGS. 1-2 that may operate using narrowband communications. As mentioned above, for communications that are within a bandwidth of wideband communications, various reference signals (e.g., CRS), may be configured to be transmitted in certain resource elements of certain RBs. Furthermore, certain synchronization signals (e.g., PSS and/or SSS) may be provided for device discovery and synchronization.

In the example of FIG. 6, a subframe 605 may include a number of RBs, including a narrowband RB 610. In this example, legacy LTE CRS resource elements (REs) 615 may be located in symbols 0, 4, 7, and 11 of an RB. In some examples, RBs 610-*a* and 610-*b* may be provided in consecutive subframes 605. Furthermore, legacy LTE PDCCH REs 620 may be provided in the first two symbols of RB 610. According to some examples, PSS REs 625 may be provided in multiple consecutive OFDM symbols, and SSS REs 630 may be provided in multiple consecutive OFDM symbols of a first RB 610-*a*. In such a manner, an entire synchronization signal may be contained in a single RB, and thus a UE 115 that receives the single RB 610-*a* may perform device discovery and synchronization when receiving narrowband transmissions that occupy a single RB in wideband transmissions. As discussed above, CRS REs 615 may be present in certain OFDM symbols, and in the example of FIG. 6, these CRS REs 615 puncture the PSS REs 625 and SSS REs 630. In some examples, a base station 105 may configure the PSS/SSS transmissions to be transmitted in symbols that do not contain CRS REs 615. In some examples, a base station 105 may configure a subframe that contains the first RB 610-*a* as a multicast/broadcast over a single frequency network (MBSFN) subframe, and thus, no CRS will be present in that subframe. A second RB 610-*b* may include PBCH REs 635, which may be transmitted using a DMRS, according to some examples.

Accordingly, the use of a common synchronization channel may be backward compatible with the CRS REs 615 for in-band deployments. In some cases, to minimize impact on other UEs 115, a certain signal transmissions may be maintained according to other wireless communication systems, such as a PSS, SSS, and PBCH in the first and sixth subframe (SF) of a transmission (e.g. in SF0 and SF5 of a radio frame), for example. Similarly, CRS (e.g. in symbols 0, 4, 7, 11), and a PDCCH region may be used. Thus, an NB-SYNC channel may be transmitted in different subframes (e.g., SF1 and SF6) to avoid legacy LTE PSS/SSS/PBCH, or the NB-SYNC channel may be transmitted outside of the center six RBs according to some examples. In some cases, the NB-SYNC channel may be transmitted in symbols 3-13 with CRS puncturing with CRS symbols. In some examples, a wireless device (e.g., an NB-IoT device) may assume that there is no CRS or PDCCH transmitted in a standalone deployment.

In some examples, an early indication of in-band or stand-alone deployments may be used to enable greater communication efficiency. In some cases, deployments using a stand-alone channel design can be made more efficient without the overhead of legacy signals, and an early indication of whether the deployment is in-band or stand-alone/guard-band may be used. In some wireless systems, PSS/SSS positions may be used to indicate TDD or FDD communication. As a result, for an indication of in-band versus stand-alone (including guard-band) deployment, there may be an NB-SYNC sequence selection and an NB-SYNC position indicated. In some cases, there may be phase flipping of NB-SYNC, where there may be no errors with Doppler shifting. In some cases, by starting from SSS or PBCH, stand-alone and guard-band deployments may be used without consideration of the channels used in other wireless communications systems.

In some examples, a different periodicity or density may be associated with in-band and stand-alone deployments. More specifically, in stand-alone deployments, the power for each particular transmission may be higher than when equivalent narrowband transmissions are embedded in-band. Accordingly, a density of transmissions of stand-alone deployments may be reduced relative to a density of transmissions for in-band deployments. Additionally, there may be a difference in PSD between stand-alone and in-band deployments, and achieving a similar DL link budget may be desired. Thus, the NB-SYNC periodicity or density may be different for in-band and stand-alone deployments.

In some examples, a different periodicity of NB-SYNC bursts may be used for in-band and stand-alone deployments. NB-SYNC may be transmitted, for example, every T1 intervals (e.g., every 100 ms) for stand-alone (including guard-band) deployments. Alternately, for an in-band deployment, NB-SYNC may be transmitted every T2 intervals (e.g., every 400 ms). A UE 115 may assume T1 to start, then move to T2 if it cannot detect the synchronization channel. In some cases, a UE 115 may use both hypothesis in parallel. In the case where a different density for each NB-SYNC burst is used, in stand-alone and/or guard-band deployments, the NB-SYNC burst may use a first level (L1), and an NB-SYNC burst may be transmitted using a second level (L2) for in-band deployments. In these cases, a UE 115 may assume L1 to start, and then try L2 if it cannot detect NB-SYNC, and the UE 115 may also attempt both hypothesis in parallel.

In some examples, a narrowband PSS (NB-PSS) and/or a narrowband SSS (NB-SSS) sequence design may be used for early indication of an in-band or stand-alone deployment, where a guard-band deployment may be treated as a stand-alone deployment. In other examples, the NB-PSS and/or NB-SSS sequence design may be used for early indication of in-band, guard-band, or stand-alone deployments. When, using NB-PSS for the indication of stand-alone, guard-band, and/or in-band deployments, different sequences (e.g., X1 and X2) may be used, where a sequence duration may match a symbol duration, and a particular sequence may indicate a particular deployment. Such techniques may also be used to provide an indication of FDD and TDD communication. In some examples, an indication of the deployment may be provided using the NB-PSS. Additionally or alternatively, the NB-SSS, or a combination of NB-PSS and NB-SSS may be used to indicate the deployment. In further examples, a narrowband PBCH (NB-PBCH) transmitted using the narrowband synchronization channel may provide such deployment indications.

In some cases, a sequence X2 may be a function of X1 (e.g., sequence X2 may be the complex conjugate of sequence X1), and the sequence itself may indicate the selection of the deployment. For example, X1 may provide an in-band deployment indication and X2 may indicate a stand-alone deployment. Alternately, the order of the sequence may indicate the selection of deployment. For example, X1, X2 may indicate an in-band deployment, and X2, X1 may indicate a stand-alone deployment. In some cases, NB-PSS may take up to 11 symbols (e.g., 14 symbols in an RB with normal cyclic prefix, less three legacy control symbols). As a result, the sequence in these 11 symbols can convey further information related to deployment schemes (e.g., sequences e.g. X1, X1, X1, X1, X1, X2, X2, X2, X2, X2 or X2, X2, X2, X2, X2, X2, X1, X1, X1, X1, X1; and X1, X2, X1, X2 or X2, X1, X2, X1 may convey additional information).

In some examples, the NB-PSS and NB-SSS may be kept relatively simple, with an indication of deployment provided in a NB-PBCH. That is, the NB-PBCH may directly indicate an in-band deployment, a stand-alone deployment, or a guard-band deployment. Additionally, in the case of in-band deployment, the NB-PBCH may also indicate what RB is used for the narrowband transmissions relative to a center frequency of the wideband transmissions.

In some examples, NB-PBCH also may be used to convey a subframe number (SFN), a physical hybrid automatic repeat request indicator channel (PHICH), a bandwidth, a number of antennas, etc. In some cases, this information may be included into one RB for transmission. For example, a NB-PBCH with a narrowband master information block (NB-MIB) may be used. Alternately, the NB-PBCH may not be transmitted, and the information may be included in a narrowband physical downlink control channel (NB-PDCCH) with a common search space. In some cases, NB-MIB and/or NB-PDCCH may be used to convey information, such as SIB scheduling, data region information (e.g., one or more narrowband regions), and a modified SFN (with a larger periodicity).

Figure 7:
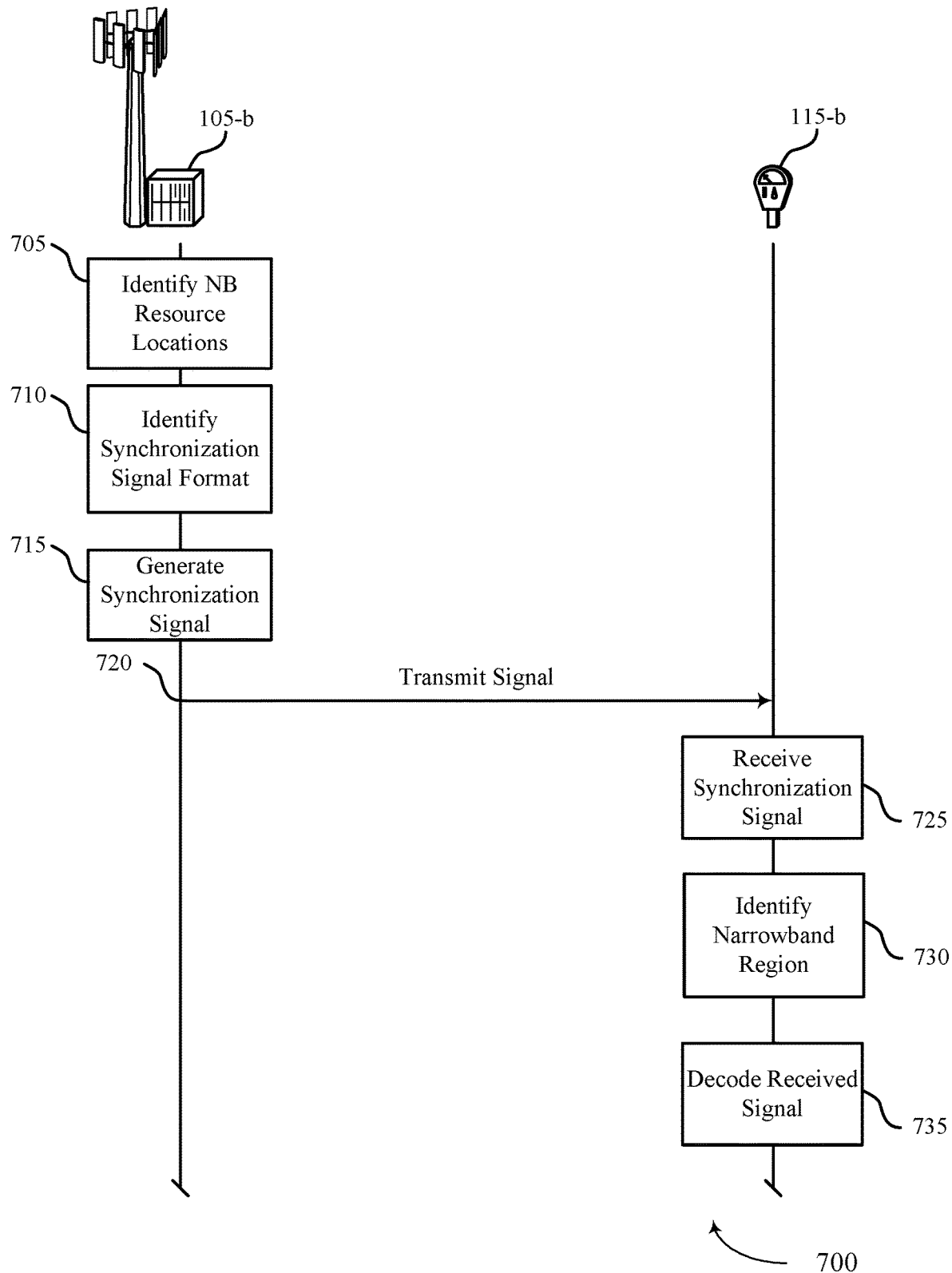
FIG. 7 illustrates an example of a process flow in a system that supports a common synchronization channel design for narrowband communications in accordance with aspects of the present disclosure.

FIG. 7 illustrates an example of a process flow 700 for narrowband synchronization techniques for narrowband wireless communications in accordance with various aspects of the present disclosure. Process flow 700 may include a UE 115-*b* and base station 105-*b*, which may be examples of a UE 115 and base station 105 described with reference to FIGS. 1-2.

Initially, at block 705, the base station 105-*b* may identify narrowband resource locations. Such narrowband resource locations may be, for example, in-band, stand-alone, or in a guard-band. Based at least in part on the narrowband resource locations, the base station 105-*b* may identify a synchronization signal format, as indicated at block 710. The synchronization signal format may be selected, in some examples, to provide an indication of the narrowband resources, such as discussed above with respect to FIGS. 1-6. At block 715, the base station 105-*b* may generate the synchronization signal. The base station 105-*b* may then transmit synchronization signal 720. The synchronization signal may be transmitted using, for example, predefined resources or preprogrammed resources, such as discussed above with respect to FIGS. 1-6.

At the UE 115-*b*, the synchronization signal may be received at block 725. At block 730, the UE 115-*b* may identify a narrowband region of the transmission. Such an identification may be made based on a sequence of information contained in the transmitted synchronization signal 720, or based on information in a NB-PBCH, as discussed above with respect to FIGS. 1-6. Such a narrowband region may be identified as an in-band region that is in-band with wideband transmissions, or as an out-of-band region such as a stand-alone or guard-band region. At block 735, the UE 115-*b* may decode the received signal.

Figure 8:
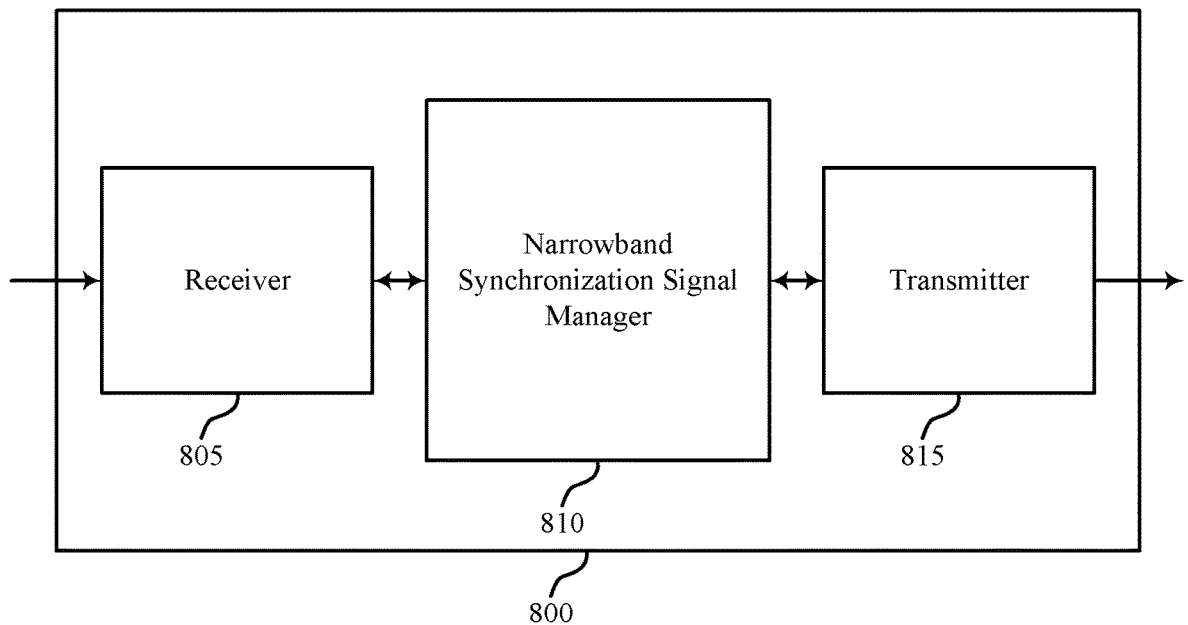
FIGS. 8-10 show block diagrams of a wireless device that supports a common synchronization channel design for narrowband communications in accordance with aspects of the present disclosure.

FIG. 8 shows a block diagram of a wireless device 800 that supports a common synchronization channel design for narrowband communications in accordance with various aspects of the present disclosure. Wireless device 800 may be an example of aspects of a base station 105 described with reference to FIGS. 1 and 2. Wireless device 800 may include receiver 805, narrowband synchronization signal manager 810, and transmitter 815. Wireless device 800 may also include a processor. Each of these components may be in communication with each other.

The receiver 805 may receive information such as packets, user data, or control information associated with various information channels (e.g., control channels, data channels, and information related to a common synchronization channel design for narrowband communications, etc.). Information may be passed on to other components of the device. The receiver 805 may be an example of aspects of the transceiver 1125 described with reference to FIG. 11.

The narrowband synchronization signal manager 810 may identify a location of the narrowband region in reference to a wideband region of the system bandwidth, identify anchor resources within a wideband bandwidth of one or more wideband transmissions for transmission of at least a portion of a synchronization signal including synchronization information for device discovery, where the anchor resources include one or more RBs located at a predefined resource location within the wideband bandwidth, and transmit at least a portion of the synchronization signal via the anchor resources.

The narrowband synchronization signal manager 810 may also identify that a location of the narrowband region is in-band within a wideband bandwidth of one or more wideband transmissions; select narrowband resources distributed in the wideband bandwidth for transmission of the narrowband transmissions, where the narrowband resources may be distributed to provide transmit diversity for the narrowband transmissions; identify common synchronization resources to be used for transmission of a synchronization signal associated with the narrowband transmissions, the synchronization signal including synchronization information for device discovery; and transmit the synchronization signal using the common synchronization resources.

The narrowband synchronization signal manager 810 may also identify common synchronization resources to be used for transmission of a synchronization signal associated with the narrowband transmissions, the synchronization signal including synchronization information for device discovery; format the synchronization signal based on the location of the narrowband region; and transmit at least a portion of the formatted synchronization signal using the common synchronization resources. The narrowband synchronization signal manager 810 may also be an example of aspects of the narrowband synchronization signal manager 1105 described with reference to FIG. 11.

The transmitter 815 may transmit signals received from other components of wireless device 800. In some examples, the transmitter 815 may be collocated with a receiver in a transceiver module. For example, the transmitter 815 may be an example of aspects of the transceiver 1125 described with reference to FIG. 11. The transmitter 815 may include a single antenna, or it may include a plurality of antennas.

Figure 9:
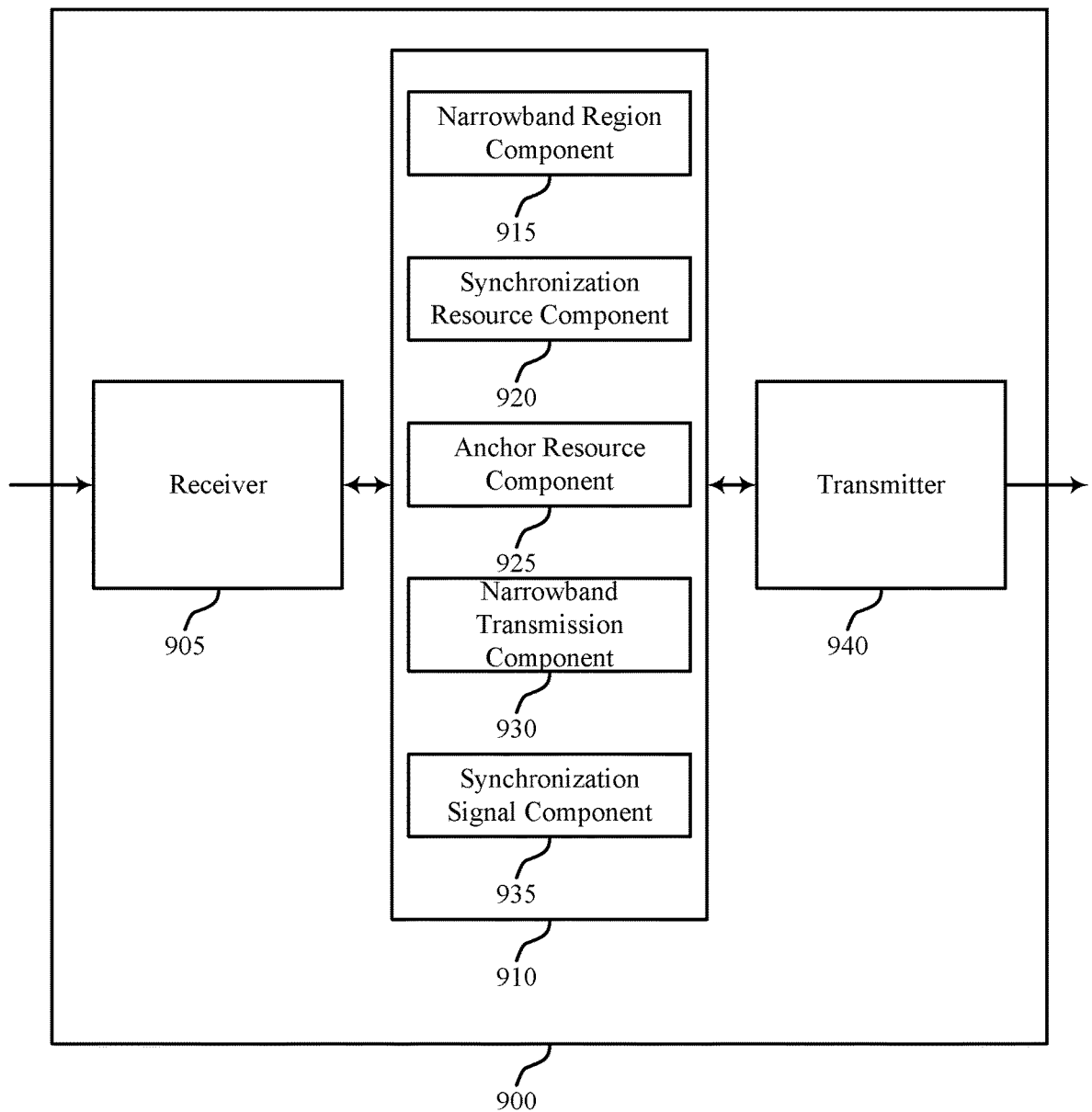

FIG. 9 shows a block diagram of a wireless device 900 that supports a common synchronization channel design for narrowband communications in accordance with various aspects of the present disclosure. Wireless device 900 may be an example of aspects of a wireless device 800 or a base station 105 described with reference to FIGS. 1, 2, and 8. Wireless device 900 may include receiver 905, narrowband synchronization signal manager 910, and transmitter 940. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The narrowband synchronization signal manager 910 may be an example of aspects of narrowband synchronization signal manager 810 described with reference to FIG. 8. The narrowband synchronization signal manager 910 may include narrowband region component 915, synchronization resource component 920, anchor resource component 925, narrowband transmission component 930 and synchronization signal component 935. The narrowband synchronization signal manager 910 may be an example of aspects of the narrowband synchronization signal manager 1105 described with reference to FIG. 11.

The narrowband region component 915 may identify the location of the narrowband region as within a guard-band bandwidth adjacent to a wideband transmissions bandwidth, identify the location of the narrowband region as within a stand-alone bandwidth that is non-adjacent to the wideband transmissions, identify a location of the narrowband region in reference to a wideband region of the system bandwidth, and identify that a location of the narrowband region is in-band within a wideband bandwidth of one or more wideband transmissions.

In some cases, the narrowband region is in-band within one or more wideband transmissions and the indication further includes an indication of narrowband communications resources within the wideband transmissions. In some cases, identifying the location of the narrowband region in reference to the wideband region of the system bandwidth includes identifying the location of the narrowband region as in-band within one or more wideband transmissions.

The synchronization resource component 920 may identify common synchronization resources to be used for transmission of a synchronization signal associated with the narrowband transmissions, the synchronization signal including synchronization information for device discovery, and identify common synchronization resources to be used for transmission of a synchronization signal associated with the narrowband transmissions, the synchronization signal including synchronization information for device discovery. In some cases, the common synchronization resources are selected to avoid resource locations for one or more of a legacy reference signal or legacy control signal.

The anchor resource component 925 may identify anchor resources within a wideband bandwidth of one or more wideband transmissions for transmission of at least a portion of a synchronization signal including synchronization information for device discovery, where the anchor resources include one or more RBs located at a predefined resource location within the wideband bandwidth. In some cases, the anchor resources include one or more RBs located at a predefined resource location in-band within one or more wideband transmissions.

In some cases, the anchor resources are used to transmit one or more of the synchronization signal, a physical broadcast channel, or a system information block for use in initial acquisition by a UE. In some cases, the anchor resources include information indicating one or more resources that contain the narrowband transmissions, and where the one or more resources are selected to provide one or more of frequency diversity, time diversity, or load balancing for the narrowband transmissions.

In some cases, the predefined resource location includes a resource block located at a fixed offset from a center frequency of the wideband bandwidth. In some cases, the anchor resources are used to transmit one or more of the synchronization signal, a physical broadcast channel, or a system information block for use in device discovery. In some cases, the anchor resources include information indicating second resources that contain the narrowband transmissions, and the second resources are selected to provide one or more of frequency diversity, time diversity, or load balancing for the narrowband transmissions. In some examples, the second resources may be located in a different narrowband region than the anchor resources.

The anchor resources may include a plurality of symbols of an RB punctured by a legacy reference signal. In some cases, the anchor resources are selected to avoid resource locations for one or more of a legacy reference signal or legacy control signal. In some cases, the common synchronization resources include anchor resources that a UE can monitor for the synchronization signal. In some cases, the anchor resources include one or more RBs located at a predefined resource location within the wideband bandwidth.

The narrowband transmission component 930 may select narrowband resources distributed in the wideband bandwidth for transmission of the narrowband transmissions, the narrowband resources distributed to provide transmit diversity for the narrowband transmissions.

The synchronization signal component 935 may set the periodicity of the synchronization signal to be a first value or a second value based on the location of the narrowband region and select the first value and second value to provide transmissions of the synchronization signal that are non-overlapping. The synchronization signal component 935 may also format the synchronization signal based on the location of the narrowband region, transmit at least a portion of the formatted synchronization signal using common synchronization resources. In some cases, formatting the synchronization signal includes providing an indication of the location of the narrowband region. Additionally or alternatively, formatting the synchronization signal includes providing an indication of whether the narrowband transmission is transmitted using frequency division duplex or time division duplex. The synchronization signal component 935 may also transmit at least a portion of the synchronization signal via the anchor resources, and transmit the synchronization signal using the common synchronization resources.

In some cases, formatting the synchronization signal includes formatting one or more of PSS information, SSS information, or PBCH information based on the location of the narrowband region. In some cases, the PSS includes an indication of the location of the narrowband region, where the indication includes a first predetermined sequence that indicates the location of the narrowband region is in-band within one or more wideband transmissions or a second predetermined sequence that indicates the location of the narrowband region is within the guard-band bandwidth or stand-alone bandwidth. In some cases, the second predetermined sequence is a complex conjugate of the first predetermined sequence.

In some cases, the PSS includes an indication of the location of the narrowband region, where the indication includes a first sequential pattern followed by a second sequential pattern to indicate that the narrowband region is in-band within one or more wideband transmissions, and where the indication includes the second sequential pattern followed by the first sequential pattern to indicate that the narrowband region is within the guard-band bandwidth or stand-alone bandwidth. In some cases, the PSS includes a plurality of OFDM symbols, and a position of predetermined information within one or more of the OFDM symbols may indicate the location of the narrowband region. In some cases, the SSS includes an indication of the location of the narrowband region.

In some cases, the indication includes a first predetermined sequence that indicates the narrowband region is in-band within one or more wideband transmissions or a second predetermined sequence that indicates the narrowband region is within the guard-band bandwidth or stand-alone bandwidth. In some cases, the indication includes a relative position of the PSS and SSS within the synchronization signal. In some cases, a periodicity or a PSD of the synchronization signal is determined based on the location of the narrowband region.

In some cases, the PSD of the synchronization signal is set to be a first level or a second level based on the location of the narrowband region. In some cases, a portion of the common synchronization resources include anchor resources that a UE can monitor for the synchronization signal. In some cases, the predefined resource location includes a resource block located at a fixed offset from a center frequency of the wideband transmissions.

In some cases, a periodicity or a PSD of the synchronization signal is determined based on a location of the anchor resources. In some cases, the synchronization signal includes one or more of PSS information, SSS information, or PBCH information, where content of one or more of the PSS, SSS, or PBCH information indicates a location of the narrowband region within the wideband bandwidth, within a guard-band bandwidth adjacent to the wideband bandwidth, or within a stand-alone bandwidth that is independent of the wideband bandwidth.

In some cases, the PSS includes an indication of the location of the narrowband region, and where the indication includes a first predetermined sequence that indicates the location of the narrowband region is within the wideband bandwidth or a second predetermined sequence that indicates the location of the narrowband region is within the guard-band bandwidth or stand-alone bandwidth. In some cases, the SSS includes an indication of the location of the narrowband region, and where the indication includes a first predetermined sequence that indicates the narrowband region is within the wideband bandwidth or a second predetermined sequence that indicates the narrowband region is within the guard-band bandwidth or stand-alone bandwidth.

In some cases, the indication includes a relative position of the PSS and SSS within the synchronization signal. In some cases, the synchronization signal includes one or more of PSS information, SSS information, or PBCH information, and where content of one or more of the PSS, SSS, or PBCH information indicates the location of the narrowband region. In some cases, the PSS includes an indication of the location of the narrowband region, where the indication includes a first predetermined sequence that indicates the location of the narrowband region is in-band within the wideband bandwidth or a second predetermined sequence that indicates the location of the narrowband region is within a guard-band bandwidth or a stand-alone bandwidth. In some cases, the SSS includes an indication of the location of the narrowband region, where the indication includes a first predetermined sequence that indicates the narrowband region is in-band within the wideband bandwidth or a second predetermined sequence that indicates the narrowband region is within a guard-band bandwidth or a stand-alone bandwidth.

The transmitter 940 may transmit signals received from other components of wireless device 900. In some examples, the transmitter 940 may be collocated with a receiver in a transceiver module. For example, the transmitter 940 may be an example of aspects of the transceiver 1125 described with reference to FIG. 11. The transmitter 940 may utilize a single antenna, or it may utilize a set of antennas.

Figure 10:
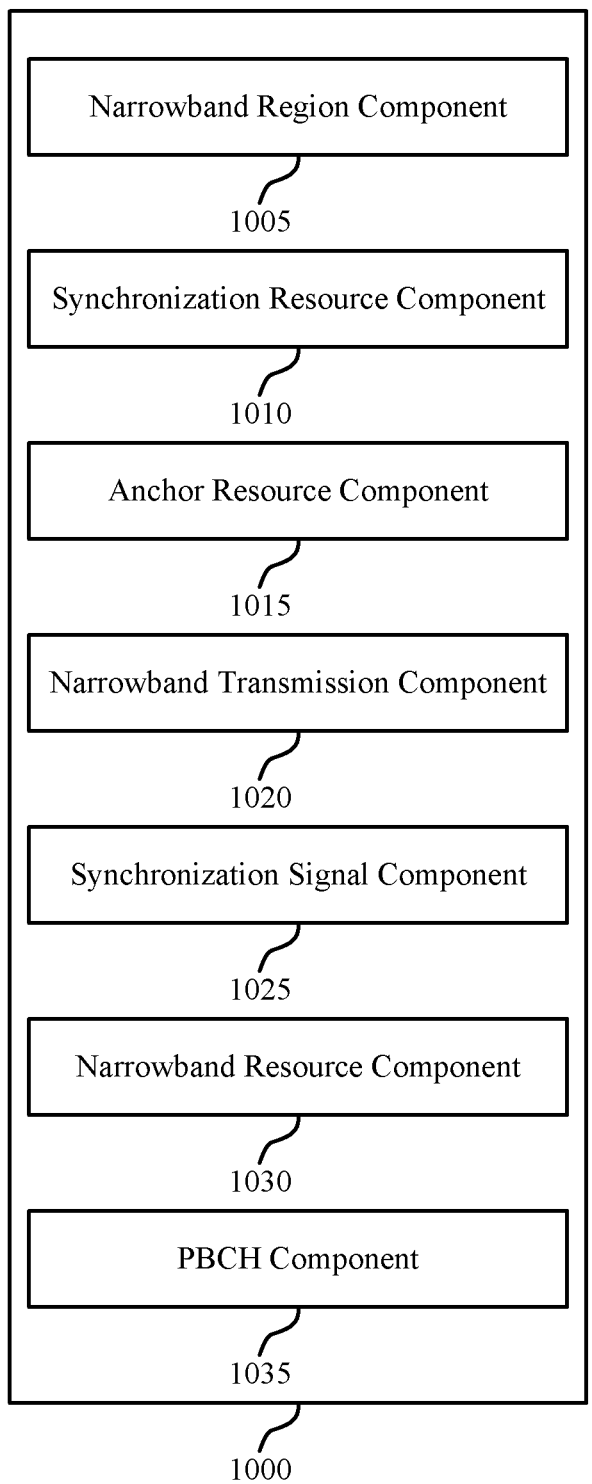

FIG. 10 shows a block diagram of a narrowband synchronization signal manager 1000 which may be an example of the corresponding component of wireless device 800 or wireless device 900. That is, narrowband synchronization signal manager 1000 may be an example of aspects of narrowband synchronization signal manager 810 or narrowband synchronization signal manager 910 described with reference to FIGS. 8 and 9. The narrowband synchronization signal manager 1000 may also be an example of aspects of the narrowband synchronization signal manager 1105 described with reference to FIG. 11.

The narrowband synchronization signal manager 1000 may include narrowband region component 1005, synchronization resource component 1010, anchor resource component 1015, narrowband transmission component 1020, synchronization signal component 1025, narrowband resource component 1030 and PBCH component 1035. Each of these modules may communicate, directly or indirectly, with one another (e.g., via one or more buses).

The narrowband region component 1005 may identify the location of the narrowband region as within a guard-band bandwidth adjacent to the wideband transmissions bandwidth, identify the location of the narrowband region as within a stand-alone bandwidth that is non-adjacent to the wideband transmissions, identify a location of the narrowband region in reference to a wideband region of the system bandwidth, and identify that a location of the narrowband region is in-band within a wideband bandwidth of one or more wideband transmissions. In some cases, the narrowband region is in-band within one or more wideband transmissions and the indication further includes an indication of narrowband communications resources within the wideband transmissions. In some cases, identifying the location of the narrowband region in reference to the wideband region of the system bandwidth includes identifying the location of the narrowband region as in-band within one or more wideband transmissions.

The synchronization resource component 1010 may identify common synchronization resources to be used for transmission of a synchronization signal associated with the narrowband transmissions, the synchronization signal including synchronization information for device discovery, and identify common synchronization resources to be used for transmission of a synchronization signal associated with the narrowband transmissions, the synchronization signal including synchronization information for device discovery. In some cases, the common synchronization resources are selected to avoid resource locations for one or more of a legacy reference signal or legacy control signal.

The anchor resource component 1015 may identify anchor resources within a wideband bandwidth of one or more wideband transmissions for transmission of at least a portion of a synchronization signal including synchronization information for device discovery, where the anchor resources include one or more RBs located at a predefined resource location within the wideband bandwidth. The narrowband transmission component 1020 may select narrowband resources distributed in the wideband bandwidth for transmission of the narrowband transmissions, the narrowband resources distributed to provide transmit diversity for the narrowband transmissions.

The synchronization signal component 1025 may set the periodicity of the synchronization signal to be a first value or a second value based on the location of the narrowband region and may select the first value and second value to provide transmissions of the synchronization signal that are non-overlapping. In some examples, the synchronization signal component 1025 may transmit at least a portion of the synchronization signal via the anchor resources, transmit the synchronization signal using the common synchronization resources, format the synchronization signal based on the location of the narrowband region, and transmit at least a portion of the formatted synchronization signal using common synchronization resources.

In some cases, formatting the synchronization signal includes providing an indication of the location of the narrowband region. Additionally or alternatively, formatting the synchronization signal includes providing an indication of whether the narrowband transmission is transmitted using frequency division duplex or time division duplex. In some cases, formatting the synchronization signal includes formatting one or more of PSS information, SSS information, or PBCH information based on the location of the narrowband region.

The narrowband resource component 1030 may be configured such that the locations of the narrowband resources and the common synchronization resources are selected to avoid resource locations for one or more of a legacy reference signal or legacy control signal.

The PBCH component 1035 may be configured such that a physical broadcast channel includes an indication of the location of the narrowband region. In some cases, the indication includes a direct indication of the location of the narrowband region. In some cases, the indication further includes one or more of a modified system frame number for the narrowband communications or information of scheduling of transmissions of a system information block. In some cases, the physical broadcast channel includes an indication of the location of the narrowband region, and where the indication includes a direct indication of the location of the narrowband region. In some cases, the physical broadcast channel includes an indication of the location of the narrowband region, and where the indication includes a direct indication of the location of the narrowband region.

Figure 11:
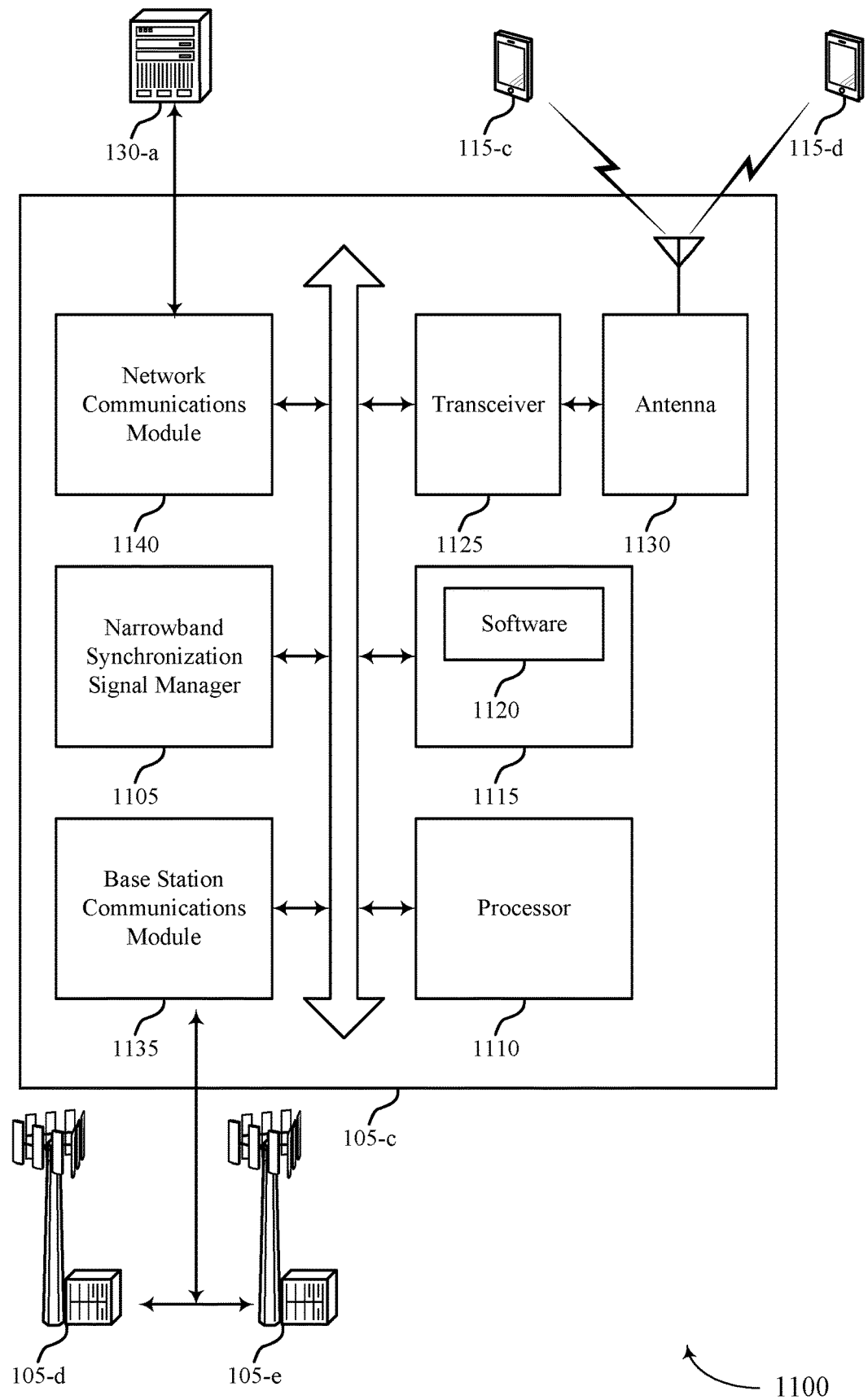
FIG. 11 shows a diagram of a wireless system including a device that supports a common synchronization channel design for narrowband communications in accordance with aspects of the present disclosure.

FIG. 11 shows a diagram of a wireless system 1100 including a device that supports a common synchronization channel design for narrowband communications in accordance with various aspects of the present disclosure. For example, system 1100 may include base station 105-*c*, which may be an example of a wireless device 800, a wireless device 900, or a base station 105 as described with reference to FIGS. 1, 2 and 8 through 10. Base station 105-*c* may also include components for bi-directional voice and data communications including components for transmitting communications and components for receiving communications. For example, base station 105-*c* may communicate bi-directionally with one or more UEs 115.

Base station 105-*c* may also include narrowband synchronization signal manager 1105, processor 1110, memory 1115, transceiver 1125, antenna 1130, base station communications module 1135 and network communications module 1140. Each of these modules may communicate, directly or indirectly, with one another (e.g., via one or more buses). The narrowband synchronization signal manager 1105 may be an example of a narrowband synchronization signal manager as described with reference to FIGS. 8 through 10.

The processor 1110 may include an intelligent hardware device (e.g., a central processing unit (CPU), a microcontroller, an application specific integrated circuit (ASIC), etc.). The memory 1115 may include random access memory (RAM) and read only memory (ROM). The memory 1115 may store computer-readable, computer-executable software including instructions that, when executed, cause the processor to perform various functions described herein (e.g., common synchronization channel design for narrowband communications, etc.). In some cases, the software 1120 may not be directly executable by the processor but may cause a computer (e.g., when compiled and executed) to perform functions described herein.

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1130, which may be capable of concurrently transmitting or receiving multiple wireless transmissions.

The base station communications module 1135 may manage communications with other base station 105, and may include a controller or scheduler for controlling communications with UEs 115 in cooperation with other base stations 105. For example, the base station communications module 1135 may coordinate scheduling for transmissions to UEs 115 for various interference mitigation techniques such as beamforming or joint transmission. In some examples, base station communications module 1135 may provide an X2 interface within an LTE/LTE-A wireless communication network technology to provide communication between base stations 105. The network communications module 1140 may manage communications with the core network (e.g., via one or more wired backhaul links). For example, the network communications module 1140 may manage the transfer of data communications for client devices, such as one or more UEs 115.

Figure 12:
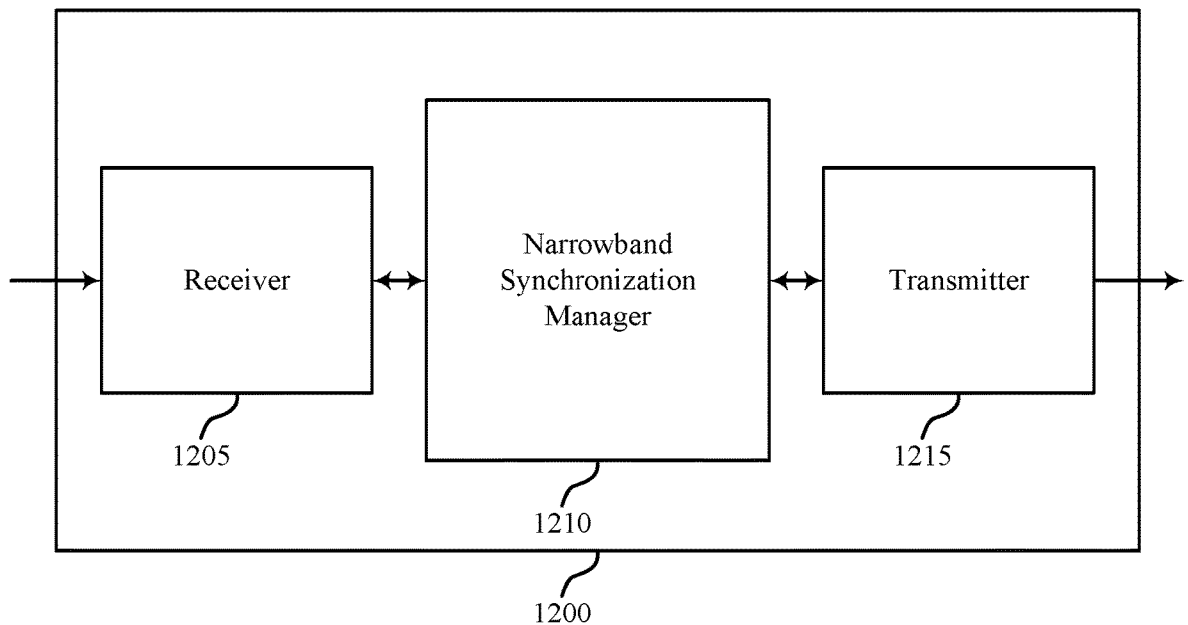
FIGS. 12-14 show block diagrams of a wireless device that supports a common synchronization channel design for narrowband communications in accordance with aspects of the present disclosure.

FIG. 12 shows a block diagram of a wireless device 1200 that supports a common synchronization channel design for narrowband communications in accordance with various aspects of the present disclosure. Wireless device 1200 may be an example of aspects of a UE 115 described with reference to FIGS. 1 and 2. Wireless device 1200 may include receiver 1205, narrowband synchronization manager 1210 and transmitter 1215. Wireless device 1200 may also include a processor. Each of these components may be in communication with each other.

The receiver 1205 may receive information such as packets, user data, or control information associated with various information channels (e.g., control channels, data channels, and information related to common synchronization channel design for narrowband communications, etc.). Information may be passed on to other components of the device. The receiver 1205 may be an example of aspects of the transceiver 1525 described with reference to FIG. 15.

The narrowband synchronization manager 1210 may identify first resources within a wideband region of the system bandwidth that contain at least a portion of a synchronization signal including synchronization information for device discovery, receive at least a portion of the synchronization signal via the first resources, and identify a location of the narrowband region in reference to the wideband region of the system bandwidth based on a format or content of the synchronization signal.

The narrowband synchronization manager 1210 may also identify anchor resources within a wideband bandwidth of one or more wideband transmissions that contain at least a portion of a synchronization signal including synchronization information for device discovery, where the anchor resources include one or more RBs located at a predefined resource location within the wideband bandwidth, and receive at least a portion of the synchronization signal via the anchor resources. The narrowband synchronization manager 1210 may also identify first resources within a wideband bandwidth of one or more wideband transmissions that contain at least a portion of a synchronization signal including synchronization information for device discovery and receive at least a portion of the synchronization signal via the first resources.

The narrowband synchronization manager 1210 may also identify, based on content of the synchronization signal, that a location of the narrowband region is in-band within a wideband bandwidth of one or more wideband transmissions, and identify narrowband resources distributed in the wideband bandwidth for receiving the narrowband transmissions, the narrowband resources distributed to provide transmit diversity for the narrowband transmissions. The narrowband synchronization manager 1210 may also be an example of aspects of the narrowband synchronization manager 1505 described with reference to FIG. 15.

The transmitter 1215 may transmit signals received from other components of wireless device 1200. In some examples, the transmitter 1215 may be collocated with a receiver in a transceiver module. For example, the transmitter 1215 may be an example of aspects of the transceiver 1525 described with reference to FIG. 15. The transmitter 1215 may include a single antenna, or it may include a plurality of antennas.

Figure 13:
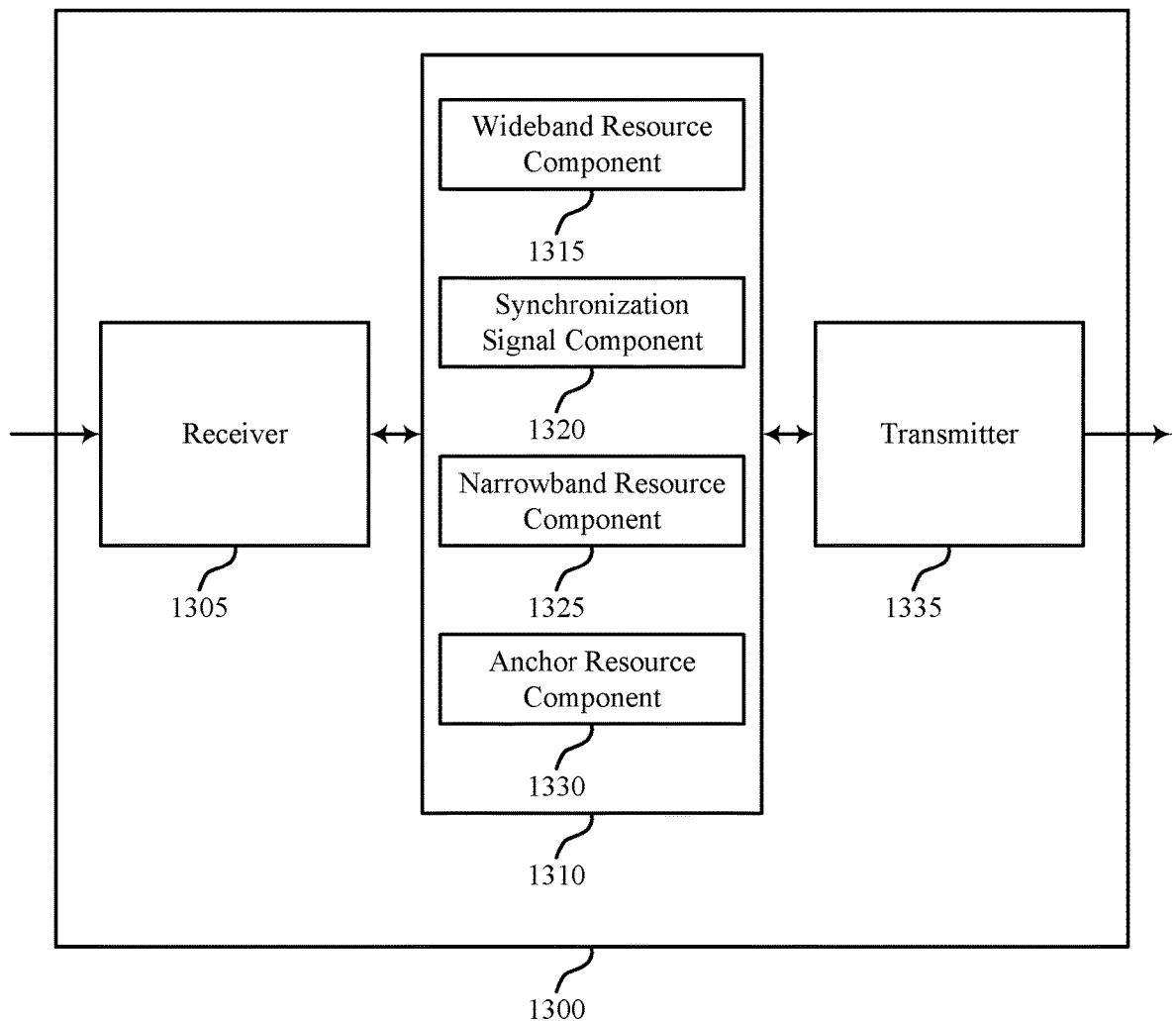

FIG. 13 shows a block diagram of a wireless device 1300 that supports a common synchronization channel design for narrowband communications in accordance with various aspects of the present disclosure. Wireless device 1300 may be an example of aspects of a wireless device 1200 or a UE 115 described with reference to FIGS. 1, 2 and 12. Wireless device 1300 may include receiver 1305, narrowband synchronization manager 1310 and transmitter 1335. Wireless device 1300 may also include a processor. Each of these components may be in communication with each other.

The receiver 1305 may receive information which may be passed on to other components of the device. The receiver 1305 may also perform the functions described with reference to the receiver 1205 of FIG. 12. The receiver 1305 may be an example of aspects of the transceiver 1525 described with reference to FIG. 15. The narrowband synchronization manager 1310 may be an example of aspects of narrowband synchronization manager 1210 described with reference to FIG. 12. The narrowband synchronization manager 1310 may include wideband resource component 1315, synchronization signal component 1320, narrowband resource component 1325 and anchor resource component 1330. The narrowband synchronization manager 1310 may be an example of aspects of the narrowband synchronization manager 1505 described with reference to FIG. 15.

The wideband resource component 1315 may identify first resources within a wideband region of the system bandwidth that contain at least a portion of a synchronization signal including synchronization information for device discovery, and identify first resources within a wideband bandwidth of one or more wideband transmissions that contain at least a portion of a synchronization signal including synchronization information for device discovery. The synchronization signal component 1320 may receive at least a portion of the synchronization signal via the first resources, receive at least a portion of the synchronization signal via the anchor resources, and receive at least a portion of the synchronization signal via the first resources.

The narrowband resource component 1325 may identify a location of the narrowband region in reference to the wideband region of the system bandwidth based on content of the synchronization signal, identify the location of the narrowband region as within a guard-band bandwidth adjacent to the wideband transmissions bandwidth, and identify the location of the narrowband region as within a stand-alone bandwidth that is non-adjacent to the wideband transmissions. In some cases, the narrowband resource component 1325 may identify, based on a format of the synchronization signal, that a location of the narrowband region is in-band within a wideband bandwidth of one or more wideband transmissions, and identify narrowband resources distributed in the wideband bandwidth for receiving the narrowband transmissions, the narrowband resources distributed to provide transmit diversity for the narrowband transmissions.

The anchor resource component 1330 may identify anchor resources within a wideband bandwidth of one or more wideband transmissions that contain at least a portion of a synchronization signal including synchronization information for device discovery, where the anchor resources include one or more RBs located at a predefined resource location within the wideband bandwidth. In some cases, the anchor resources include information indicating second resources that contain the narrowband transmissions, and the second resources are selected to provide frequency diversity or load balancing. The second resources may be located in a different location than the anchor resources, and the wireless device 1300 may communicate using the second resources. In some examples, wireless device 1300 may periodically check the anchor resources based on a SIB change.

The transmitter 1335 may transmit signals received from other components of wireless device 1300. In some examples, the transmitter 1335 may be collocated with a receiver in a transceiver module. For example, the transmitter 1335 may be an example of aspects of the transceiver 1525 described with reference to FIG. 15. The transmitter 1335 may utilize a single antenna, or it may utilize a plurality of antennas.

Figure 14:
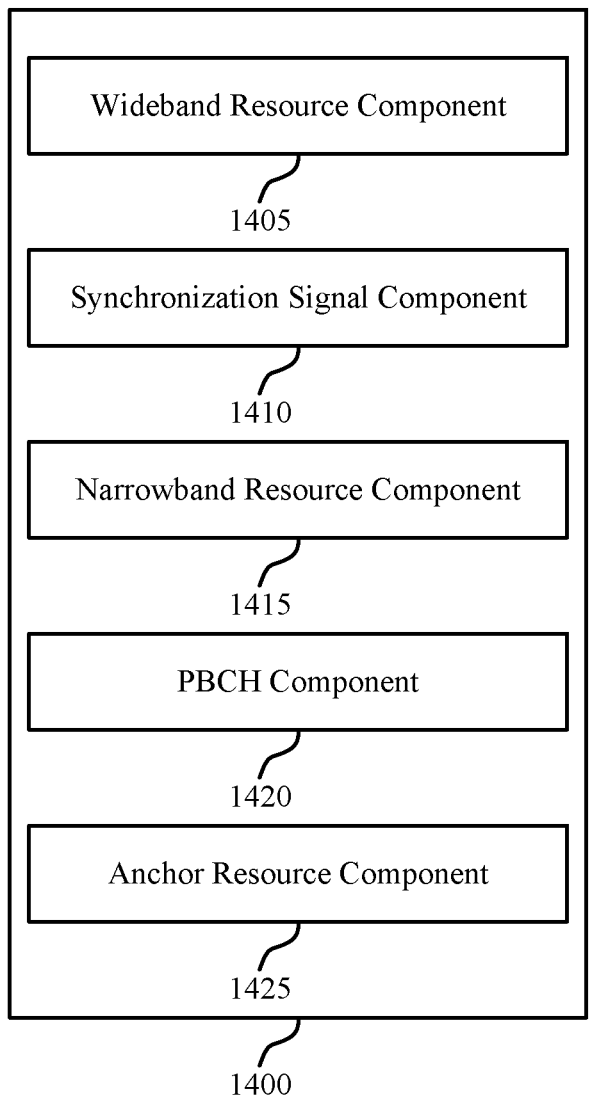

FIG. 14 shows a block diagram of a narrowband synchronization manager 1400 which may be an example of the corresponding component of wireless device 1200 or wireless device 1300. That is, narrowband synchronization manager 1400 may be an example of aspects of narrowband synchronization manager 1210 or narrowband synchronization manager 1310 described with reference to FIGS. 12 and 13. The narrowband synchronization manager 1400 may also be an example of aspects of the narrowband synchronization manager 1505 described with reference to FIG. 15. The narrowband synchronization manager 1400 may include wideband resource component 1405, synchronization signal component 1410, narrowband resource component 1415, PBCH component 1420 and anchor resource component 1425. Each of these modules may communicate, directly or indirectly, with one another (e.g., via one or more buses).

The wideband resource component 1405 may identify first resources within a wideband region of the system bandwidth that contain at least a portion of a synchronization signal including synchronization information for device discovery and identify first resources within a wideband bandwidth of one or more wideband transmissions that contain at least a portion of a synchronization signal including synchronization information for device discovery.

The synchronization signal component 1410 may receive at least a portion of the synchronization signal via the first resources, receive at least a portion of the synchronization signal via the anchor resources, and receive at least a portion of the synchronization signal via the first resources. The narrowband resource component 1415 may identify a location of the narrowband region in reference to the wideband region of the system bandwidth based on content of the synchronization signal, identify the location of the narrowband region as within a guard-band bandwidth adjacent to the wideband transmissions bandwidth, and identify the location of the narrowband region as within a stand-alone bandwidth that is non-adjacent to the wideband transmissions. In some examples, the synchronization signal component 1410 may identify, based on content of the synchronization signal, that a location of the narrowband region is in-band within a wideband bandwidth of one or more wideband transmissions and identify narrowband resources distributed in the wideband bandwidth for receiving the narrowband transmissions, the narrowband resources distributed to provide transmit diversity for the narrowband transmissions.

The PBCH component 1420 may be configured such that a physical broadcast channel includes an indication of the location of the narrowband region. The anchor resource component 1425 may identify anchor resources within a wideband bandwidth of one or more wideband transmissions that contain at least a portion of a synchronization signal including synchronization information for device discovery, where the anchor resources include one or more RBs located at a predefined resource location within the wideband bandwidth.

Figure 15:
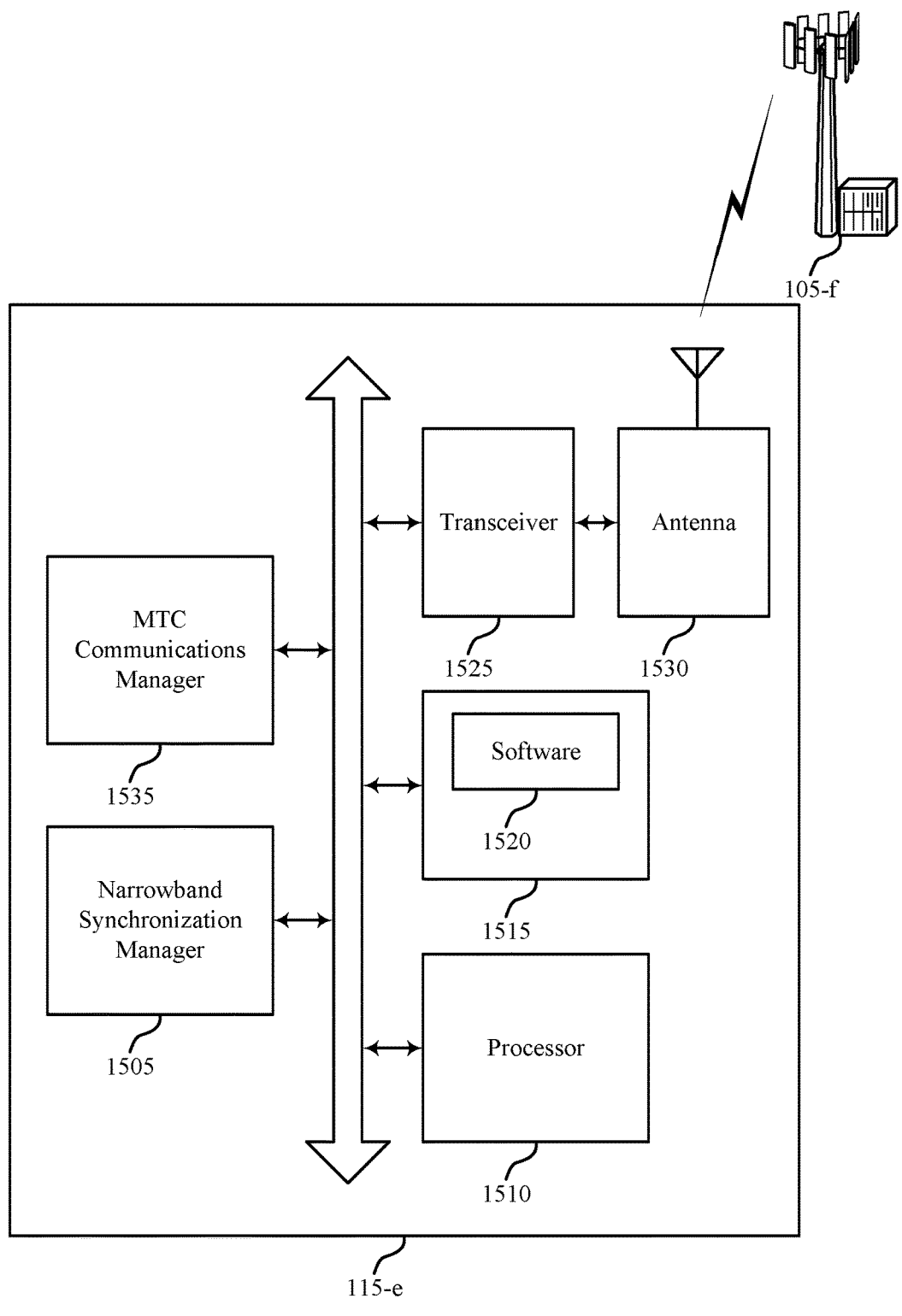
FIG. 15 shows a diagram of a system including a device that supports a common synchronization channel design for narrowband communications in accordance with aspects of the present disclosure.

FIG. 15 shows a diagram of a system 1500 including a device that supports a common synchronization channel design for narrowband communications in accordance with various aspects of the present disclosure. For example, system 1500 may include UE 115-e, which may be an example of a wireless device 1200, a wireless device 1300, or a UE 115 as described with reference to FIGS. 1, 2 and 12 through 14. UE 115-e may also include narrowband synchronization manager 1505, processor 1510, memory 1515, transceiver 1525, antenna 1530 and MTC communication manager 1535. Each of these modules may communicate, directly or indirectly, with one another (e.g., via one or more buses). The narrowband synchronization manager 1505 may be an example of a narrowband synchronization manager as described with reference to FIGS. 12 through 14.

The processor 1510 may include an intelligent hardware device (e.g., a CPU, a microcontroller, an ASIC, etc.). The memory 1515 may include RAM and ROM. The memory 1515 may store computer-readable, computer-executable software including instructions that, when executed, cause the processor to perform various functions described herein (e.g., common synchronization channel design for narrowband communications, etc.). In some cases, the software 1520 may not be directly executable by the processor but may cause a computer (e.g., when compiled and executed) to perform functions described herein.

The transceiver 1525 may communicate bi-directionally, via one or more antennas, wired, or wireless links, with one or more networks, as described above. For example, the transceiver 1525 may communicate bi-directionally with a base station 105 or a UE 115. The transceiver 1525 may also include a modem to modulate the packets and provide the modulated packets to the antennas for transmission, and to demodulate packets received from the antennas. In some cases, the wireless device may include a single antenna 1530. However, in some cases the device may have more than one antenna 1530, which may be capable of concurrently transmitting or receiving multiple wireless transmissions. The MTC communication manager 1535 may enable MTC operations such as operation within a narrowband region or using narrowband resources as described herein.

Figure 16:
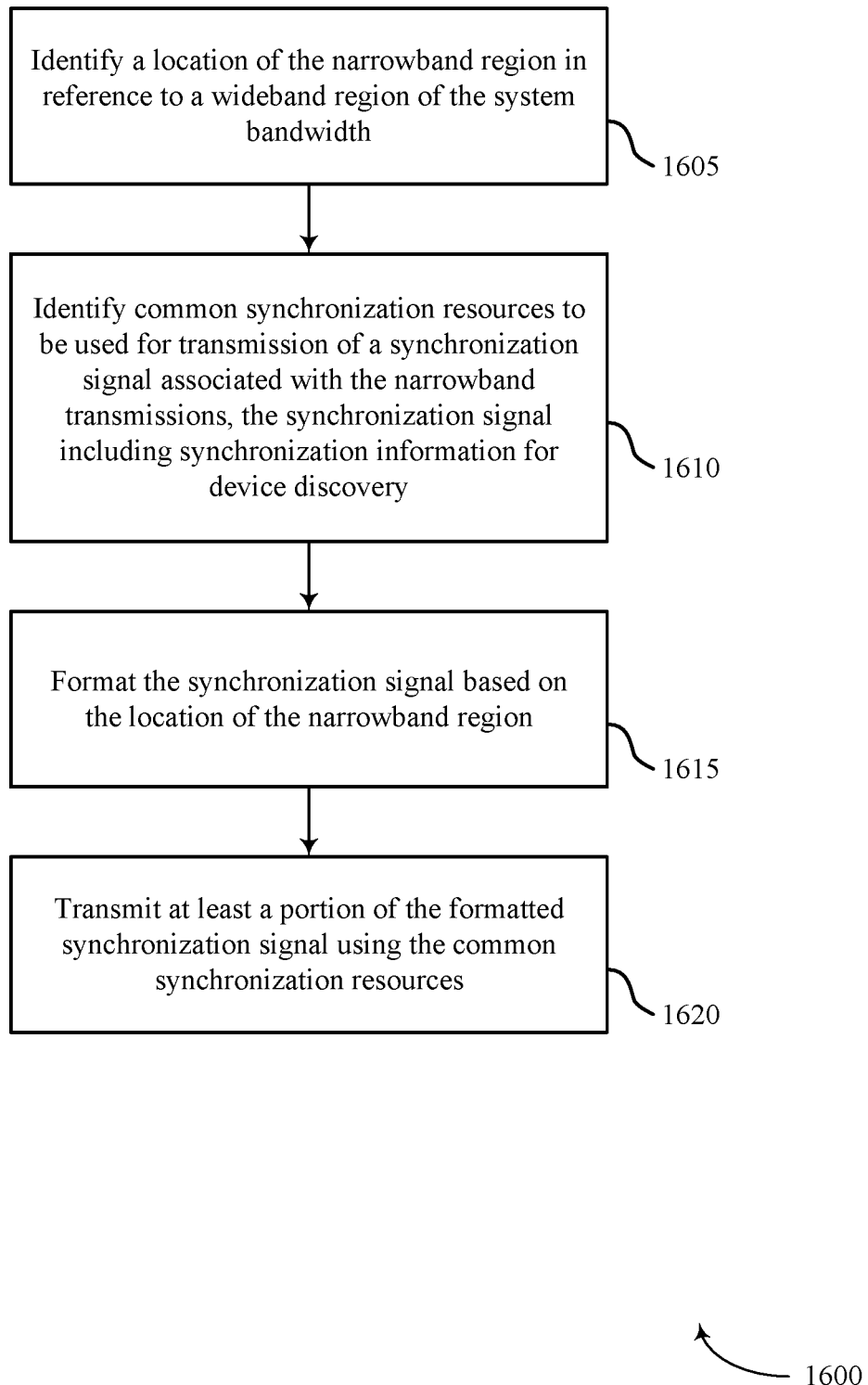
FIGS. 16-21 illustrate methods for a common synchronization channel design for narrowband communications in accordance with aspects of the present disclosure.

FIG. 16 shows a flowchart illustrating a method 1600 for common synchronization channel design for narrowband communications in accordance with various aspects of the present disclosure. The operations of method 1600 may be implemented by a base station 105 or its components as described with reference to FIGS. 1 and 2. For example, the operations of method 1600 may be performed by the narrowband synchronization signal manager as described herein. In some examples, the base station 105 may execute a set of codes to control the functional elements of the device to perform the functions described below. Additionally or alternatively, the base station 105 may perform aspects of the functions described below using special-purpose hardware.

At block 1605, the base station 105 may identify a location of the narrowband region in reference to a wideband region of the system bandwidth as described above with reference to FIGS. 2 through 7. In certain examples, the operations of block 1605 may be performed by the narrowband region component as described with reference to FIG. 9.

At block 1610, the base station 105 may identify common synchronization resources to be used for transmission of a synchronization signal associated with the narrowband transmissions, the synchronization signal including synchronization information for device discovery as described above with reference to FIGS. 2 through 7. In certain examples, the operations of block 1610 may be performed by the synchronization resource component as described with reference to FIG. 9.

At block 1615, the base station 105 may format the synchronization signal based on the location of the narrowband region as described above with reference to FIGS. 2 through 7. In certain examples, the operations of block 1615 may be performed by the synchronization signal component as described with reference to FIG. 9.

At block 1620, the base station 105 may transmit at least a portion of the formatted synchronization signal using the common synchronization resources as described above with reference to FIGS. 2 through 7. In certain examples, the operations of block 1620 may be performed by the synchronization signal component as described with reference to FIG. 9.

Figure 17:
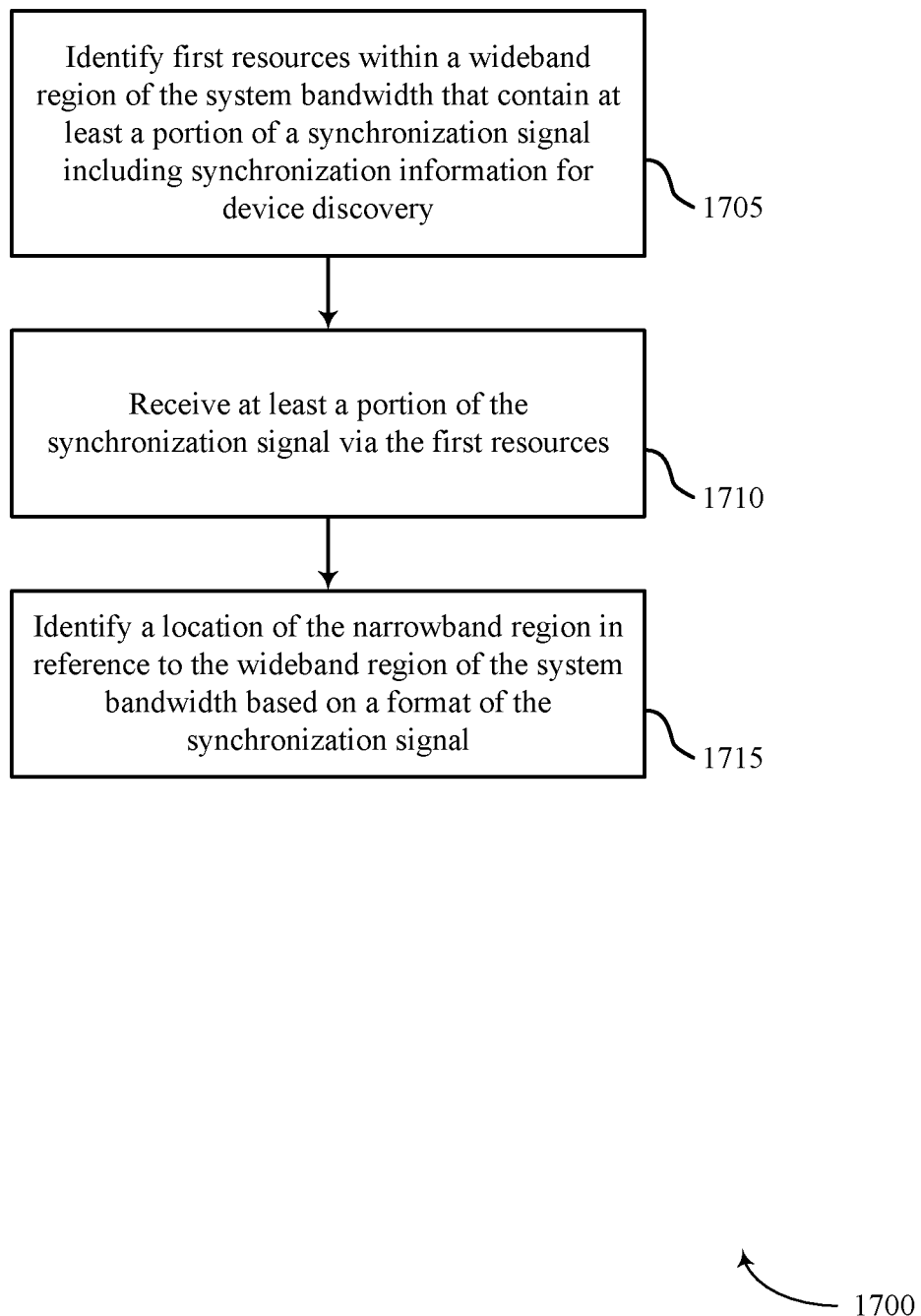

FIG. 17 shows a flowchart illustrating a method 1700 for common synchronization channel design for narrowband communications in accordance with various aspects of the present disclosure. The operations of method 1700 may be implemented by a UE 115 or its components as described with reference to FIGS. 1 and 2. For example, the operations of method 1700 may be performed by the narrowband synchronization manager as described herein. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may identify first resources within a wideband region of the system bandwidth that contain at least a portion of a synchronization signal including synchronization information for device discovery as described above with reference to FIGS. 2 through 7. In certain examples, the operations of block 1705 may be performed by the wideband resource component as described with reference to FIG. 13.

At block 1710, the UE 115 may receive at least a portion of the synchronization signal via the first resources as described above with reference to FIGS. 2 through 7. In certain examples, the operations of block 1710 may be performed by the synchronization signal component as described with reference to FIG. 13.

At block 1715, the UE 115 may identify a location of the narrowband region in reference to the wideband region of the system bandwidth based on a format of the synchronization signal as described above with reference to FIGS. 2 through 7. In certain examples, the operations of block 1715 may be performed by the narrowband resource component as described with reference to FIG. 13.

Figure 18:
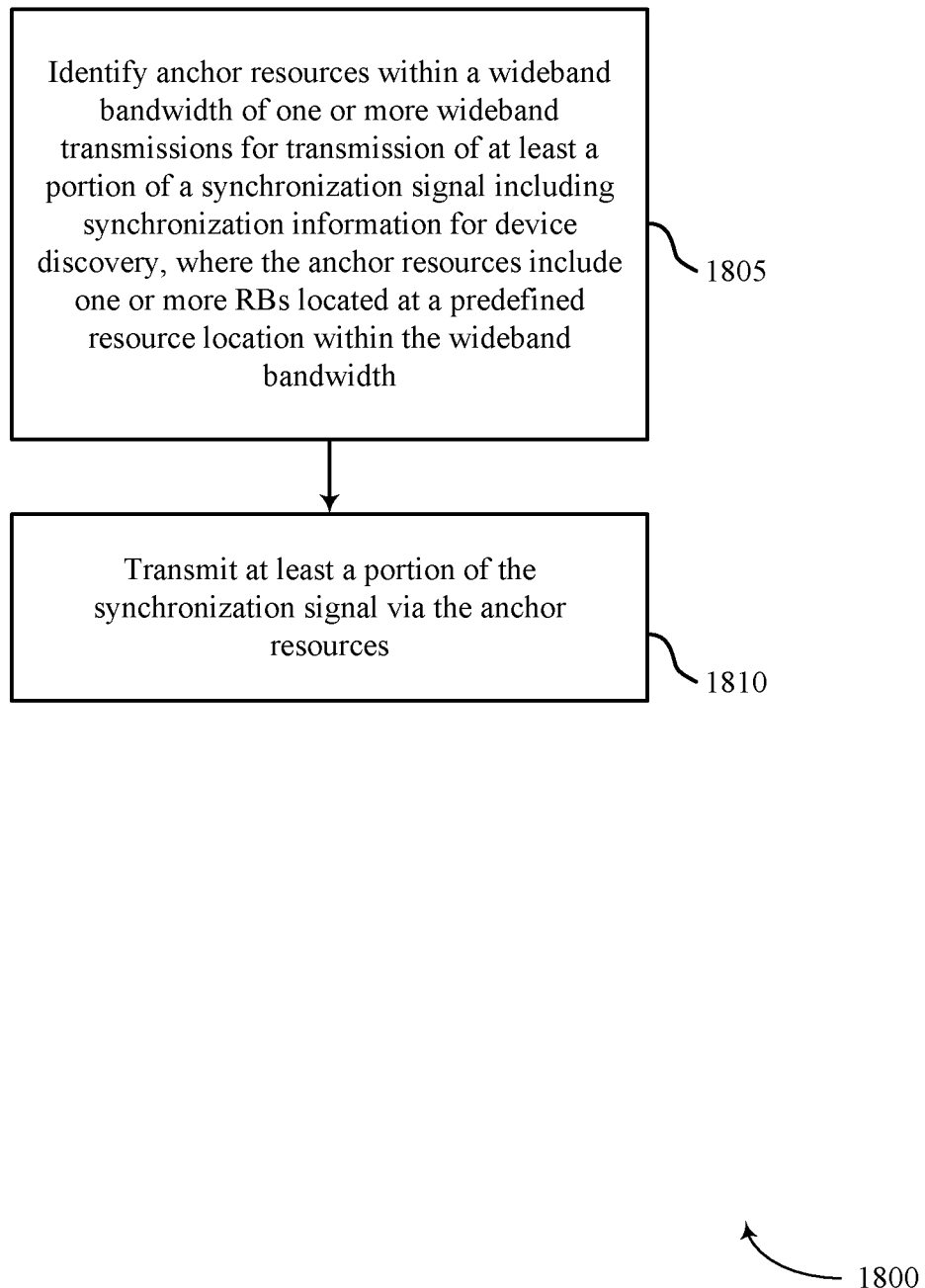

FIG. 18 shows a flowchart illustrating a method 1800 for common synchronization channel design for narrowband communications in accordance with various aspects of the present disclosure. The operations of method 1800 may be implemented by a base station 105 or its components as described with reference to FIGS. 1 and 2. For example, the operations of method 1800 may be performed by the narrowband synchronization signal manager as described herein. In some examples, the base station 105 may execute a set of codes to control the functional elements of the device to perform the functions described below. Additionally or alternatively, the base station 105 may perform aspects of the functions described below using special-purpose hardware.

At block 1805, the base station 105 may identify anchor resources within a wideband bandwidth of one or more wideband transmissions for transmission of at least a portion of a synchronization signal including synchronization information for device discovery, where the anchor resources include one or more RBs located at a predefined resource location within the wideband bandwidth as described above with reference to FIGS. 2 through 7. In certain examples, the operations of block 1805 may be performed by the anchor resource component as described with reference to FIG. 9.

At block 1810, the base station 105 may transmit at least a portion of the synchronization signal via the anchor resources as described above with reference to FIGS. 2 through 7. In certain examples, the operations of block 1810 may be performed by the synchronization signal component as described with reference to FIG. 9.

Figure 19:
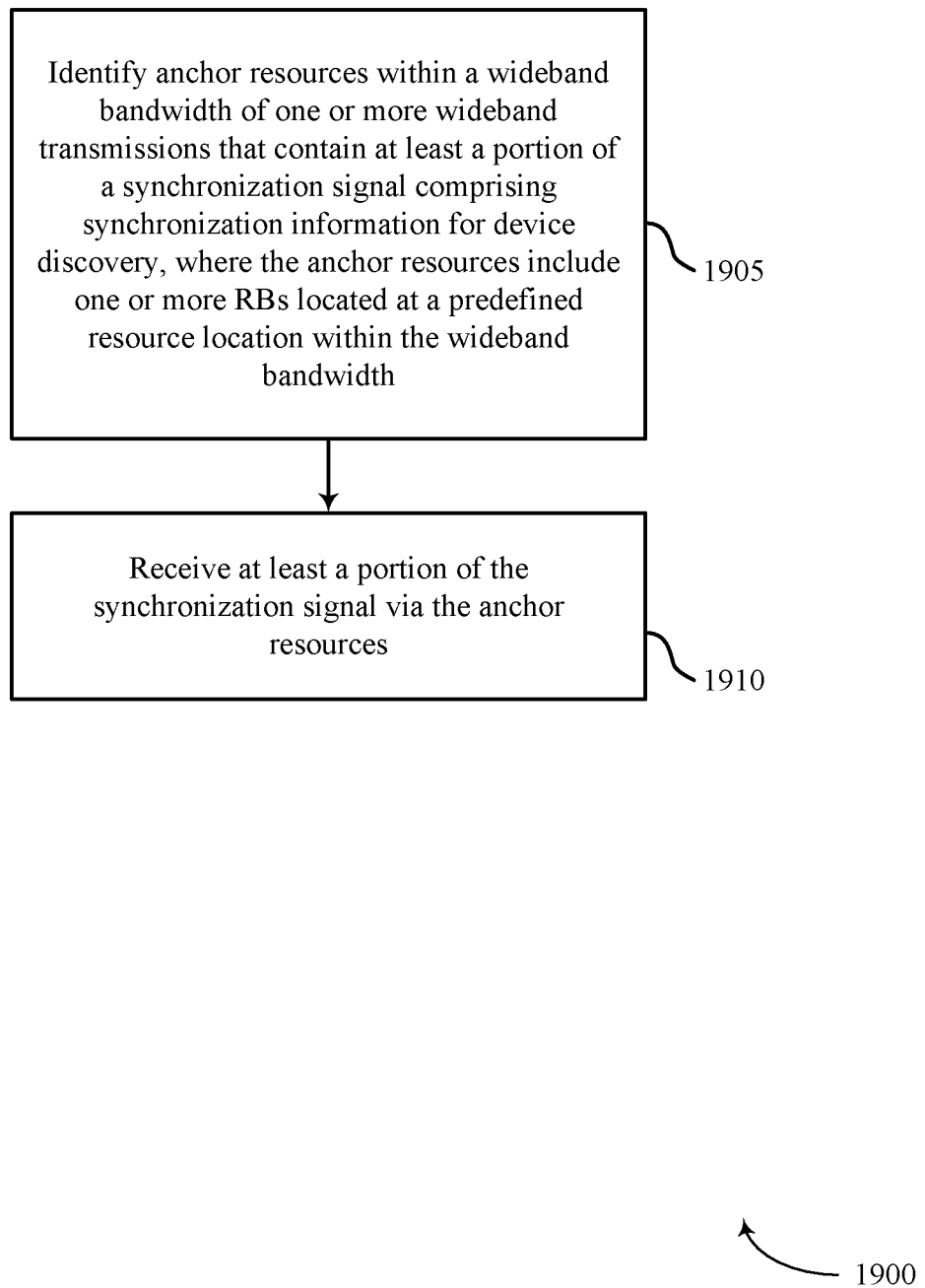

FIG. 19 shows a flowchart illustrating a method 1900 for common synchronization channel design for narrowband communications in accordance with various aspects of the present disclosure. The operations of method 1900 may be implemented by a UE 115 or its components as described with reference to FIGS. 1 and 2. For example, the operations of method 1900 may be performed by the narrowband synchronization manager as described herein. In some examples, the UE 115 may execute a set of codes to control the functional elements of the device to perform the functions described below. Additionally or alternatively, the UE 115 may perform aspects of the functions described below using special-purpose hardware.

At block 1905, the UE 115 may identify anchor resources within a wideband bandwidth of one or more wideband transmissions that contain at least a portion of a synchronization signal including synchronization information for device discovery, where the anchor resources include one or more RBs located at a predefined resource location within the wideband bandwidth as described above with reference to FIGS. 2 through 7. In certain examples, the operations of block 1905 may be performed by the anchor resource component as described with reference to FIG. 13.

At block 1910, the UE 115 may receive at least a portion of the synchronization signal via the anchor resources as described above with reference to FIGS. 2 through 7. In certain examples, the operations of block 1910 may be performed by the synchronization signal component as described with reference to FIG. 13.

Figure 20:
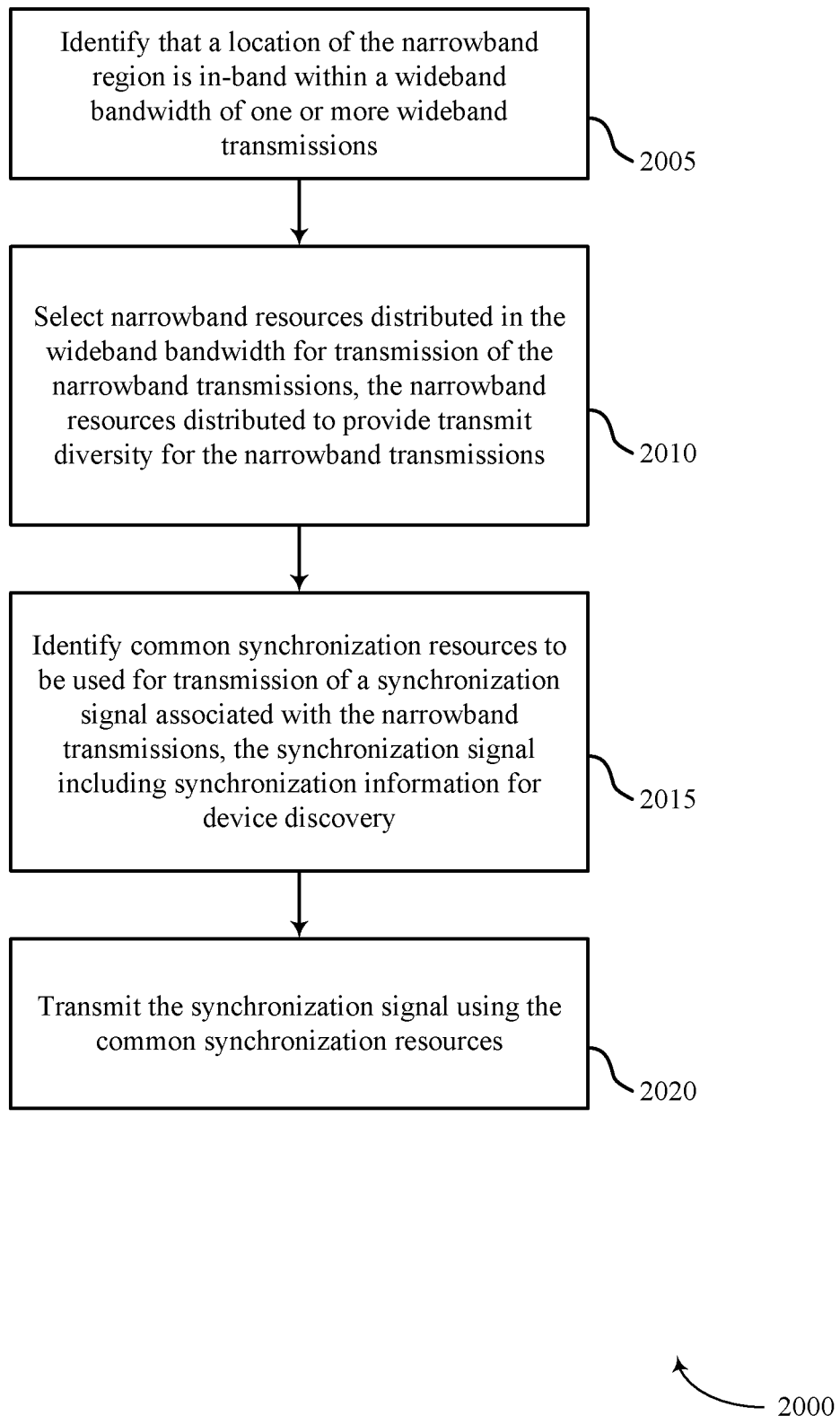

FIG. 20 shows a flowchart illustrating a method 2000 for common synchronization channel design for narrowband communications in accordance with various aspects of the present disclosure. The operations of method 2000 may be implemented by a base station 105 or its components as described with reference to FIGS. 1 and 2. For example, the operations of method 2000 may be performed by the narrowband synchronization signal manager as described herein. In some examples, the base station 105 may execute a set of codes to control the functional elements of the device to perform the functions described below. Additionally or alternatively, the base station 105 may perform aspects of the functions described below using special-purpose hardware.

At block 2005, the base station 105 may identify that a location of the narrowband region is in-band within a wideband bandwidth of one or more wideband transmissions as described above with reference to FIGS. 2 through 7. In certain examples, the operations of block 2005 may be performed by the narrowband region component as described with reference to FIG. 9.

At block 2010, the base station 105 may select narrowband resources distributed in the wideband bandwidth for transmission of the narrowband transmissions, the narrowband resources distributed to provide transmit diversity for the narrowband transmissions as described above with reference to FIGS. 2 through 7. In certain examples, the operations of block 2010 may be performed by the narrowband transmission component as described with reference to FIG. 9.

At block 2015, the base station 105 may identify common synchronization resources to be used for transmission of a synchronization signal associated with the narrowband transmissions, the synchronization signal including synchronization information for device discovery as described above with reference to FIGS. 2 through 7. In certain examples, the operations of block 2015 may be performed by the synchronization resource component as described with reference to FIG. 9.

At block 2020, the base station 105 may transmit the synchronization signal using the common synchronization resources as described above with reference to FIGS. 2 through 7. In certain examples, the operations of block 2020 may be performed by the synchronization signal component as described with reference to FIG. 9.

Figure 21:
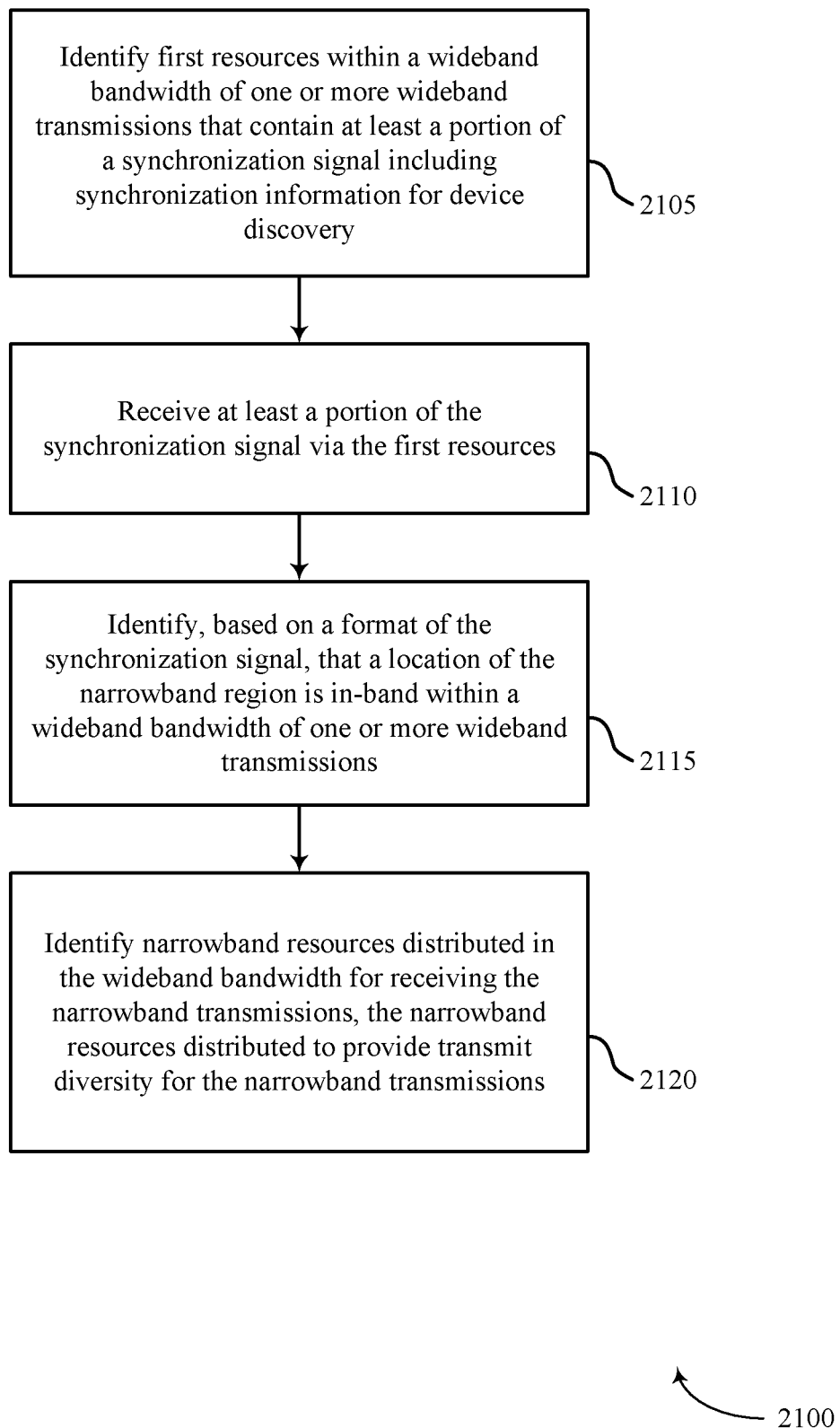

FIG. 21 shows a flowchart illustrating a method 2100 for common synchronization channel design for narrowband communications in accordance with various aspects of the present disclosure. The operations of method 2100 may be implemented by a UE 115 or its components as described with reference to FIGS. 1 and 2. For example, the operations of method 2100 may be performed by the narrowband synchronization manager as described herein. In some examples, the UE 115 may execute a set of codes to control the functional elements of the device to perform the functions described below. Additionally or alternatively, the UE 115 may perform aspects of the functions described below using special-purpose hardware.

At block 2105, the UE 115 may identify first resources within a wideband bandwidth of one or more wideband transmissions that contain at least a portion of a synchronization signal including synchronization information for device discovery as described above with reference to FIGS. 2 through 7. In certain examples, the operations of block 2105 may be performed by the wideband resource component as described with reference to FIG. 13.

At block 2110, the UE 115 may receive at least a portion of the synchronization signal via the first resources as described above with reference to FIGS. 2 through 7. In certain examples, the operations of block 2110 may be performed by the synchronization signal component as described with reference to FIG. 13.

At block 2115, the UE 115 may identify, based on content of the synchronization signal, that a location of the narrowband region is in-band within a wideband bandwidth of one or more wideband transmissions as described above with reference to FIGS. 2 through 7. In certain examples, the operations of block 2115 may be performed by the narrowband resource component as described with reference to FIG. 13.

At block 2120, the UE 115 may identify narrowband resources distributed in the wideband bandwidth for receiving the narrowband transmissions, the narrowband resources distributed to provide transmit diversity for the narrowband transmissions as described above with reference to FIGS. 2 through 7. In certain examples, the operations of block 2120 may be performed by the narrowband resource component as described with reference to FIG. 13.

In some examples, aspects from two or more of the methods 1600, 1700, 1800, 1900, 2000, or 2100 described with reference to FIG. 16, 17, a8, a9, 20, or 21 may be combined. It should be noted that the methods 1600, 1700, 1800, 1900, 2000, or 2100 are just example implementations, and that the operations of the methods 1600, 1700, 1800, 1900, 2000, or 2100 may be rearranged or otherwise modified such that other implementations are possible. For example, aspects of each of the methods may include steps or aspects of the other methods, or other steps or techniques described herein. Thus, aspects of the disclosure may provide for common synchronization channel design for narrowband communications.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Techniques described herein may be used for various wireless communications systems such as code division multiple access (CDMA), time division multiple access (TDMA), frequency division multiple access (FDMA, orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for common synchronization channel design for narrowband communications. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., structured/platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication in a system that supports in-band narrowband transmissions in a narrowband region of a system bandwidth, comprising:
   determining to monitor for narrowband synchronization information for device discovery on anchor resources comprising one or more resource blocks (RBs) located at a predefined resource location within a wideband bandwidth, the predefined resource location based at least in part on a predefined RB mapping;
   identifying the anchor resources and the predefined resource location for the in-band narrowband transmissions, the anchor resources comprising information indicating second resources for narrowband transmissions, wherein the predefined resource location comprises an RB located at an offset from a center frequency of the wideband bandwidth, the RB reserved for transmission of synchronization signals;
   monitoring the anchor resources for the narrowband synchronization information based at least in part on identifying the anchor resources; and
   receiving, via the anchor resources and based at least in part on monitoring the anchor resources, system information and at least a portion of a synchronization signal comprising the narrowband synchronization information.

2. The method of claim 1, wherein the anchor resources are used to receive one or more of the synchronization signal, a physical broadcast channel (PBCH), or a system information block (SIB) for use in initial acquisition of the in-band narrowband transmissions.

3. The method of claim 1, wherein the second resources are selected to provide one or both of frequency diversity or load balancing.

4. The method of claim 3, wherein the second resources are located in a different narrowband region than the anchor resources.

5. The method of claim 3, further comprising:
   communicating using the second resources; and
   periodically checking the anchor resources based at least in part on a SIB change.

6. The method of claim 1, wherein one or more of a periodicity or a power spectral density (PSD) of the synchronization signal is determined based on a location of the anchor resources.

7. The method of claim 1, wherein the synchronization signal comprises physical broadcast channel (PBCH) information, and wherein content of the PBCH information indicates a location of the narrowband region within the wideband bandwidth, within a guard-band bandwidth adjacent to the wideband bandwidth, or within a stand-alone bandwidth that is independent of the wideband bandwidth.

8. The method of claim 7, wherein the PBCH comprises one or more of an indication of the location of the narrowband region, a modified system frame number for the in-band narrowband transmissions, or SIB information, and wherein the indication comprises one or more of a direct indication of the location of the narrowband region.

9. The method of claim 1, wherein the anchor resources are used to receive a physical downlink control channel, wherein the physical downlink control channel comprises one or more of an indication of a location of the narrowband region, a modified system frame number for the in-band narrowband transmissions, or SIB information.

10. The method of claim 1, wherein the anchor resources comprise a plurality of symbols of an RB punctured by a legacy reference signal.

11. The method of claim 1, wherein the anchor resources are selected to avoid resource locations for one or more of a legacy reference signal or legacy control signal.

12. The method of claim 1, further comprising:
identifying, based at least in part on a format of the synchronization signal, that a location of the narrowband region is in-band within a wideband bandwidth of one or more wideband transmission; and
identifying narrowband resources distributed in the wideband bandwidth for receiving the in-band narrowband transmissions, the narrowband resources distributed to provide transmit diversity for the in-band narrowband transmissions.

13. An apparatus for wireless communication in a system that supports in-band narrowband transmissions in a narrowband region of a system bandwidth, comprising:
means for determining to monitor for narrowband synchronization information for device discovery on anchor resources comprising one or more resource blocks (RBs) located at a predefined resource location within a wideband bandwidth, the predefined resource location based at least in part on a predefined RB mapping;
means for identifying the anchor resources and the predefined resource location for the in-band narrowband transmissions, the anchor resources comprising information indicating second resources for narrowband transmissions, wherein the predefined resource location comprises an RB located at an offset from a center frequency of the wideband bandwidth, the RB reserved for transmission of synchronization signals;
means for monitoring the anchor resources for the narrowband synchronization information based at least in part on identifying the anchor resources; and
means for receiving, via the anchor resources and based at least in part on monitoring the anchor resources, system information and at least a portion of a synchronization signal comprising the narrowband synchronization information.

14. The apparatus of claim 13, wherein the anchor resources are used to receive one or more of the synchronization signal, a physical broadcast channel (PBCH), or a system information block (SIB) for use in initial acquisition of the in-band narrowband transmissions.

15. The apparatus of claim 13, wherein the second resources are selected to provide one or both of frequency diversity or load balancing.

16. The apparatus of claim 15, wherein the second resources are located in a different narrowband region than the anchor resources.

17. The apparatus of claim 15, further comprising:
means for communicating using the second resources; and
means for periodically checking the anchor resources based at least in part on a SIB change.

18. The apparatus of claim 13, wherein one or more of a periodicity or a power spectral density (PSD) of the synchronization signal is determined based on a location of the anchor resources.

19. The apparatus of claim 13, wherein
the synchronization signal comprises: physical broadcast channel (PBCH) information, and wherein content of the PBCH information indicates a location of the narrowband region within the wideband bandwidth, within a guard-band bandwidth adjacent to the wideband bandwidth, or within a stand-alone bandwidth that is independent of the wideband bandwidth.

20. The apparatus of claim 19, wherein the PBCH comprises one or more of an indication of the location of the narrowband region, a modified system frame number for the in-band narrowband transmissions, or SIB information, and wherein the indication comprises one or more of a direct indication of the location of the narrowband region.

21. The apparatus of claim 13, wherein the anchor resources are used to receive a physical downlink control channel, wherein the physical downlink control channel comprises one or more of an indication of a location of the narrowband region, a modified system frame number for the in-band narrowband transmissions, or SIB information.

22. The apparatus of claim 13, wherein the anchor resources comprise a plurality of symbols of an RB punctured by a legacy reference signal.

23. The apparatus of claim 13, wherein the anchor resources are selected to avoid resource locations for one or more of a legacy reference signal or legacy control signal.

24. The apparatus of claim 13, further comprising:
means for identifying, based at least in part on a format of the synchronization signal, that a location of the narrowband region is in-band within a wideband bandwidth of one or more wideband transmission; and
means for identifying narrowband resources distributed in the wideband bandwidth for receiving the in-band narrowband transmissions, the narrowband resources distributed to provide transmit diversity for the in-band narrowband transmissions.

25. An apparatus for wireless communication in a system that supports in-band narrowband transmissions in a narrowband region of a system bandwidth, comprising:
a processor;
memory in electronic communication with the processor; and
instructions stored in the memory and operable, when executed by the processor, to cause the apparatus to:
determine to monitor for narrowband synchronization information for device discovery on anchor resources comprising one or more resource blocks (RBs) located at a predefined resource location within a wideband bandwidth, the predefined resource location based at least in part on a predefined RB mapping;
identify the anchor resources and the predefined resource location for the in-band narrowband transmissions, the anchor resources comprising information indicating second resources for narrowband transmissions, wherein the predefined resource location comprises an RB located at an offset from a center frequency of the wideband bandwidth, the RB reserved for transmission of synchronization signals;

monitor the anchor resources for the narrowband synchronization information based at least in part on identifying the anchor resources; and receive, via the anchor resources and based at least in part on monitoring the anchor resources, system information and at least a portion of a synchronization signal comprising the narrowband synchronization information.

26. The apparatus of claim 25, wherein the anchor resources are used to receive one or more of the synchronization signal, a physical broadcast channel (PBCH), or a system information block (SIB) for use in initial acquisition of the in-band narrowband transmissions.

27. The apparatus of claim 25, wherein the second resources are selected to provide one or both of frequency diversity or load balancing.

28. The apparatus of claim 27, wherein the second resources are located in a different narrowband region than the anchor resources.

29. The apparatus of claim 27, wherein the instructions are further executable by the processor to:
communicating using the second resources; and
periodically check the anchor resources based at least in part on a SIB change.

30. The apparatus of claim 25, wherein one or more of a periodicity or a power spectral density (PSD) of the synchronization signal is determined based on a location of the anchor resources.

31. The apparatus of claim 25, wherein
the synchronization signal comprises physical broadcast channel (PBCH) information, and wherein content of the PBCH information indicates a location of the narrowband region within the wideband bandwidth, within a guard-band bandwidth adjacent to the wideband bandwidth, or within a stand-alone bandwidth that is independent of the wideband bandwidth.

32. The apparatus of claim 31, wherein the PBCH comprises one or more of an indication of the location of the narrowband region, a modified system frame number for the in-band narrowband transmissions, or SIB information, and wherein the indication comprises one or more of a direct indication of the location of the narrowband region.

33. The apparatus of claim 25, wherein the anchor resources are used to receive a physical downlink control channel, wherein the physical downlink control channel comprises one or more of an indication of a location of the narrowband region, a modified system frame number for the in-band narrowband transmissions, or SIB information.

34. The apparatus of claim 25, wherein the anchor resources comprise a plurality of symbols of an RB punctured by a legacy reference signal.

35. The apparatus of claim 25, wherein the anchor resources are selected to avoid resource locations for one or more of a legacy reference signal or legacy control signal.

36. The apparatus of claim 25, wherein the instructions are further executable by the processor to:
identify, based at least in part on a format of the synchronization signal, that a location of the narrowband region is in-band within a wideband bandwidth of one or more wideband transmission; and
identify narrowband resources distributed in the wideband bandwidth for receiving the in-band narrowband transmissions, the narrowband resources distributed to provide transmit diversity for the in-band narrowband transmissions.

37. A non-transitory computer readable medium storing code for wireless communication in a system that supports in-band narrowband transmissions in a narrowband region of a system bandwidth, the code comprising instructions executable by a processor to:
determine to monitor for narrowband synchronization information for device discovery on anchor resources comprising one or more resource blocks (RBs) located at a predefined resource location within a wideband bandwidth, the predefined resource location based at least in part on a predefined RB mapping;
identify the anchor resources and the predefined resource location for the in-band narrowband transmissions, the anchor resources comprising information indicating second resources for narrowband transmissions, wherein the predefined resource location comprises an RB located at an offset from a center frequency of the wideband bandwidth, the RB reserved for transmission of synchronization signals;
monitor the anchor resources for the narrowband synchronization information based at least in part on identifying the anchor resources; and
receive, via the anchor resources and based at least in part on monitoring the anchor resources, system information and at least a portion of a synchronization signal comprising the narrowband synchronization information.

* * * * *